(12) United States Patent
Hara

(10) Patent No.: US 9,230,147 B2
(45) Date of Patent: Jan. 5, 2016

(54) METHOD AND APPARATUS FOR OPTICALLY READING OUT INFORMATION STORED IN A BARCODE

(75) Inventor: Masahiro Hara, Nagoya (JP)

(73) Assignee: DENSO WAVE INCORPORATED, Aichi-pref. (JP)

(*) Notice: Subject to any disclaimer, the term of this patent is extended or adjusted under 35 U.S.C. 154(b) by 2603 days.

(21) Appl. No.: 11/354,994

(22) Filed: Feb. 16, 2006

(65) Prior Publication Data
US 2006/0180669 A1    Aug. 17, 2006

(30) Foreign Application Priority Data

Feb. 16, 2005 (JP) ................................. 2005-039129

(51) Int. Cl.
G06K 7/10  (2006.01)
G06K 7/14  (2006.01)

(52) U.S. Cl.
CPC .............. G06K 7/10871 (2013.01); G06K 7/10 (2013.01); G06K 7/1486 (2013.01)

(58) Field of Classification Search
USPC ................. 235/462.07, 462.16–462.19, 494
See application file for complete search history.

(56) References Cited

U.S. PATENT DOCUMENTS

| | | | | |
|---|---|---|---|---|
| 4,667,089 A * | 5/1987 | Shirakabe | ............ | G06K 7/0166 235/462.08 |
| 4,687,912 A * | 8/1987 | Ohta | ........................ | 235/462.19 |
| 4,782,220 A * | 11/1988 | Shuren | ............... | G06K 7/10851 235/462.18 |
| 4,859,840 A * | 8/1989 | Hasegawa | ................ | G06K 7/14 235/462.18 |
| 4,873,426 A * | 10/1989 | Sarna et al. | ................ | 235/462.1 |
| 5,036,183 A * | 7/1991 | Ouchi | ................ | G06K 7/10851 235/462.19 |
| 5,142,130 A * | 8/1992 | Sato | .................... | G06K 7/10851 235/436 |
| 5,311,000 A * | 5/1994 | Brooks | ...................... | G06K 7/14 235/462.16 |
| 5,369,264 A * | 11/1994 | Rosa | ........................ | G06K 5/00 235/462.02 |
| 5,414,252 A * | 5/1995 | Shinoda | .................... | G06K 7/14 235/462.07 |
| 5,489,769 A * | 2/1996 | Kubo | ....................... | 235/462.09 |
| 5,514,858 A * | 5/1996 | Ackley | ..................... | 235/462.16 |
| 5,539,191 A * | 7/1996 | Ackley | ..................... | 235/462.26 |
| 5,550,366 A * | 8/1996 | Roustaei | ............ | G06K 7/10891 235/455 |
| 5,686,715 A * | 11/1997 | Watanabe | .............. | G06K 7/016 235/436 |
| 5,739,518 A | 4/1998 | Wang | | |

(Continued)

FOREIGN PATENT DOCUMENTS

| | | |
|---|---|---|
| EP | 1 182 604 A1 | 2/2002 |
| EP | 1 513 095 A2 | 3/2005 |

(Continued)

OTHER PUBLICATIONS

Office Action dated Feb. 5, 2008 in corresponding Japanese Patent Application No. 2005-039129 (and English translation).

(Continued)

Primary Examiner — Daniel Walsh
(74) Attorney, Agent, or Firm — Posz Law Group, PLC

(57) ABSTRACT

In a method, whether there is a first bar having a width and located at at least one of both ends of a first black and white pattern is determined. The width of the bar is greater than a maximum width of a second bar. The maximum width of the second bar appears in a second black and white pattern assuming that the black and white pattern is part of the first barcode. The first black and white pattern is determined as readout data of the second barcode when it is determined that there is the first bar having the width greater than the maximum width of the second bar and located at at least one of both ends of the first black and white pattern.

10 Claims, 14 Drawing Sheets

(56) References Cited

U.S. PATENT DOCUMENTS

| | | | |
|---|---|---|---|
| 5,767,497 A * | 6/1998 | Lei ........................... | 235/462.12 |
| 5,811,781 A * | 9/1998 | Ackley .................... | 235/462.01 |
| 6,073,847 A * | 6/2000 | Reichenbach ....... | G06K 7/1491 |
| | | | 235/462.12 |
| 6,164,543 A * | 12/2000 | Kato ....................... | G06K 7/14 |
| | | | 235/462.01 |
| 6,321,987 B1 | 11/2001 | Watanabe et al. | |
| 6,386,454 B2 * | 5/2002 | Hecht et al. .............. | 235/462.16 |
| 6,616,039 B1 * | 9/2003 | Saporetti ............ | G06K 7/10722 |
| | | | 235/454 |
| 2001/0006191 A1 * | 7/2001 | Hecht et al. .............. | 235/462.16 |
| 2001/0038037 A1 * | 11/2001 | Bridgelall et al. ....... | 235/462.14 |
| 2001/0045461 A1 * | 11/2001 | Schuessler ............... | 235/462.07 |
| 2003/0080191 A1 * | 5/2003 | Lubow et al. ............ | 235/462.01 |
| 2004/0041029 A1 * | 3/2004 | Postman et al. ........... | 235/462.3 |
| 2006/0108424 A1 * | 5/2006 | Kim ................... | G06K 7/10851 |
| | | | 235/462.16 |
| 2007/0069027 A1 * | 3/2007 | Madej ................ | G06K 7/10851 |
| | | | 235/462.32 |
| 2007/0295812 A1 * | 12/2007 | Mazowiesky .......... | G07D 7/121 |
| | | | 235/454 |
| 2008/0245871 A1 * | 10/2008 | Sato ................... | G06K 7/10851 |
| | | | 235/462.12 |

FOREIGN PATENT DOCUMENTS

| | | |
|---|---|---|
| JP | A-S57-023178 | 2/1982 |
| JP | A-H04-216184 | 8/1992 |
| JP | H06-295352 | 10/1994 |
| JP | A-H07-239899 | 9/1995 |
| JP | A-H08-185463 | 7/1996 |
| JP | A-2003-022416 | 1/2003 |
| JP | A-2005-512371 | 4/2005 |
| WO | WO 03/049007 | 6/2003 |

OTHER PUBLICATIONS

European Search Report dated May 11, 2009 in the corresponding EP application No. 06003017.8 (and English translation).

Extended European Search Report dated Jul. 8, 2009 issued from the European Patent Office in the corresponding European patent application No. 06003017.8 (English translation).

"Locating and Determining the Tilt of a Barcode in a Camera's Field of View," *IBM Technical Disclosure Bulletin*, IBM Corp., New York, vol. 37, No. 6B, Jun. 1994, pp. 385-387.

* cited by examiner

METHOD AND APPARATUS FOR OPTICALLY READING OUT INFORMATION STORED IN A BARCODE

CROSS REFERENCE TO RELATED APPLICATION

This application is based on Japanese Patent Application 2005-039129 filed on Feb. 16, 2005. This application claims the benefit of priority from the Japanese Patent Application, so that the descriptions of which are all incorporated herein by reference.

BACKGROUND OF THE INVENTION

1. Field of the Invention

The present invention relates to methods and apparatuses, which are capable of optically reading out information stored in different barcode symbologies, and relates to a program product executable by computers for controlling the apparatuses.

2. Description of the Related Art

Different barcode symbologies have been designed and actually utilized. Some barcode symbologies partially consist of another one of barcode symbologies. Barcode readers for meeting readout of such different symbologies of barcodes are required to clearly identify each symbology of the barcodes, otherwise read errors may occur.

For example, Japanese Unexamined Patent Publication No. H6-295352 discloses an example of the structure of an apparatus capable of meeting readout of a plurality of symbologies of barcodes.

The techniques disclosed in the Patent Publication initially carry out processes associated with readout in common among the plurality of symbologies of barcodes to shorten the time required to read out information stored in at least one of the plurality of symbologies of barcodes.

The techniques disclosed in the Patent Publication therefore fail to show how to identify each symbology of barcodes when scanning similar symbologies of barcodes.

SUMMARY OF THE INVENTION

The present invention has been made on the background so that preferable embodiments of the invention are capable of clearly identifying individual symbologies of barcodes when scanning a plurality of symbologies thereof.

According to one aspect of the present invention, there is provided a method of optically reading out one of a plurality of symbologies of barcodes and of decoding information stored in the one of the barcodes. The plurality of symbologies include first and second symbologies different from each other. The barcodes include first and second barcodes based on the first and second symbologies, respectively. The method includes decoding a first black and white pattern in string using an algorism corresponding to the second symbology. The first black and white pattern is created by binarizing electric signals corresponding to optical information. The optical information is obtained by optical readout of a barcode. The first black and white pattern is composed of pieces of digital data corresponding to bars in black and white. The method includes determining whether there is a first bar having a width and located at at least one of both ends of the first black and white pattern. The width of the bar is greater than a maximum width of a second bar. The maximum width of the second bar appears in a second black and white pattern assuming that the black and white pattern is part of the first barcode. The method includes determining that the first black and white pattern as readout data of the second barcode when it is determined that there is the first bar having the width greater than the maximum width of the second bar and located at at least one of both ends of the first black and white pattern.

According to another aspect of the present invention, there is provided a method of optically reading out one of a plurality of symbologies of barcodes and of decoding information stored in the one of the barcodes. The plurality of symbologies include first and second symbologies different from each other. The barcodes include first and second barcodes based on the first and second symbologies, respectively. The method includes decoding a first black and white pattern in string using an algorism corresponding to the second symbology. The first black and white pattern is created by binarizing electric signals corresponding to optical information. The optical information is obtained by optical readout of a barcode. The first black and white pattern is composed of pieces of digital data corresponding to bars in black and white. The method includes determining whether there is an at least one of a specified pattern stipulated by the first symbology and located at at least one of both ends of the first black and white pattern. The method includes determining that the decode of the first black and white pattern is NG when it is determined that there is the at least one of the specified pattern stipulated by the first symbology and located at at least one of both ends of the first black and white pattern.

According to a further aspect of the present invention, there is provided a method of optically reading out one of a plurality of symbologies of barcodes and of decoding information stored in the one of the barcodes. The plurality of symbologies include first and second symbologies different from each other. The barcodes include first and second barcodes based on the first and second symbologies, respectively, the second barcode containing at its both ends no margins stipulated by the second symbology. The method includes decoding a first black and white pattern in string using an algorism corresponding to the second symbology. The first black and white pattern is created by binarizing electric signals corresponding to optical information. The optical information is obtained by optical readout of a barcode. The first black and white pattern is composed of pieces of digital data corresponding to bars in black and white. The method includes determining whether there is an at least one of a specified pattern stipulated by the first symbology and located at at least one of both ends of the first black and white pattern. The method includes determining that the decode of the first black and white pattern is NG when it is determined that there is the at least one of the specified pattern stipulated by the first symbology and located at at least one of both ends of the first black and white pattern.

According to a still further aspect of the present invention, there is provided a method of optically reading out one of a plurality of symbologies of barcodes located in a field of view and of decoding information stored in the one of the barcodes. The plurality of symbologies include first and second symbologies different from each other. The barcodes include first and second barcodes based on the first and second symbologies, respectively. The second barcode contains at its both ends no margins stipulated by the second symbology. The method includes decoding a first black and white pattern in string using an algorism corresponding to the second symbology. The first black and white pattern is created by binarizing electric signals corresponding to optical information. The optical information is obtained by optical readout of a barcode. The first black and white pattern is composed of pieces of digital data corresponding to bars in black and white. The method includes determining where there are predetermined distances between both ends of the first black and white pattern and corresponding edges of the field of view. The method includes determining that the decode of the first black and white pattern is NG when it is determined that there are no predetermined distances between both ends of the first black and white pattern and corresponding edges of the field of view.

According to a still further aspect of the present invention, there is provided a method of optically reading out a barcode using an area sensor. The method includes decoding a black and white pattern in string, the black and white pattern being created by binarizing electric signals corresponding to optical information. The optical information is obtained by optical readout of the barcode. The black and white pattern is composed of pieces of digital data corresponding to bars in black and white. The method includes setting a plurality of check lines on one external side region of at least one of both ends of the black and white pattern at different points in a height direction of the black and white pattern, respectively. The check lines extend outwardly from the at least one of both ends of the black and white pattern. The height direction is orthogonal to a length direction of the black and white pattern. The method includes determining whether a predetermined margin is ensured along individually each of the check lines.

According to a still further aspect of the present invention, there is provided a barcode reading apparatus capable of performing the methods according to the aspects of the present invention.

According to a still further aspect of the present invention, there is provided a program product having a computer program and a signal bearing media bearing the computer program. The computer program is designed to optically read out one of a plurality of symbologies of barcodes and of decoding information stored in the one of the barcodes. The plurality of symbologies include first and second symbologies different from each other. The barcodes include first and second barcodes based on the first and second symbologies, respectively. The computer program includes means for instructing a computer to:

decode a first black and white pattern in string using an algorism corresponding to the second symbology, the first black and white pattern being created by binarizing electric signals corresponding to optical information, the optical information being obtained by optical readout of a barcode, the first black and white pattern being composed of pieces of digital data corresponding to bars in black and white;

determine whether there is a first bar having a width and located at at least one of both ends of the first black and white pattern, the width of the bar being greater than a maximum width of a second bar, the maximum width of the second bar appearing in a second black and white pattern assuming that the black and white pattern is part of the first barcode; and determine that the first black and white pattern as readout data of the second barcode when it is determined that there is the first bar having the width greater than the maximum width of the second bar and located at at least one of both ends of the first black and white pattern.

According to a still further aspect of the present invention, there is provided a program product having a computer program and a signal bearing media bearing the computer program. The computer program is designed to optically read out one of a plurality of symbologies of barcodes and of decoding information stored in the one of the barcodes. The plurality of symbologies include first and second symbologies different from each other. The barcodes include first and second barcodes based on the first and second symbologies, respectively. The computer program includes means for instructing a computer to:

decode a first black and white pattern in string using an algorism corresponding to the second symbology, the first black and white pattern being created by binarizing electric signals corresponding to optical information, the optical information being obtained by optical readout of a barcode, the first black and white pattern being composed of pieces of digital data corresponding to bars in black and white;

determine whether there is an at least one of a specified pattern stipulated by the first symbology and located at at least one of both ends of the first black and white pattern; and determine that the decode of the first black and white pattern is NG when it is determined that there is the at least one of the specified pattern stipulated by the first symbology and located at at least one of both ends of the first black and white pattern.

According to a still further aspect of the present invention, there is provided a program product having a computer program and a signal bearing media bearing the computer program. The computer program is designed to optically read out one of a plurality of symbologies of barcodes and of decoding information stored in the one of the barcodes. The plurality of symbologies include first and second symbologies different from each other. The barcodes include first and second barcodes based on the first and second symbologies, respectively. The second barcode contains at its both ends no margins stipulated by the second symbology. The computer program includes means for instructing a computer to:

decode a first black and white pattern in string using an algorism corresponding to the second symbology, the first black and white pattern being created by binarizing electric signals corresponding to optical information, the optical information being obtained by optical readout of a barcode, the first black and white pattern being composed of pieces of digital data corresponding to bars in black and white;

determine whether there is an at least one of a specified pattern stipulated by the first symbology and located at at least one of both ends of the first black and white pattern; and determine that the decode of the first black and white pattern is NG when it is determined that there is the at least one of the specified pattern stipulated by the first symbology and located at at least one of both ends of the first black and white pattern.

According to a still further aspect of the present invention, there is provided a program product having a computer program and a signal bearing media bearing the computer program. The computer program is designed to optically read out one of a plurality of symbologies of barcodes located in a field of view and of decoding information stored in the one of the barcodes. The plurality of symbologies include first and second symbologies different from each other. The barcodes include first and second barcodes based on the first and second symbologies, respectively. The second barcode contains at its both ends no margins stipulated by the second symbology. The computer program includes means for instructing a computer to:

decode a first black and white pattern in string using an algorism corresponding to the second symbology, the first black and white pattern being created by binarizing electric signals corresponding to optical information, the optical information being obtained by optical readout of a barcode, the first black and white pattern being composed of pieces of digital data corresponding to bars in black and white;

determine where there are predetermined distances between both ends of the first black and white pattern and corresponding edges of the field of view; and determine that the decode of the first black and white pattern is NG when it is determined that there are no predetermined distances between both ends of the first black and white pattern and corresponding edges of the field of view.

According to a still further aspect of the present invention, there is provided a program product having a computer program and a signal bearing media bearing the computer program. The computer program is designed to optically read out a barcode using an area sensor. The computer program includes means for instructing a computer to:

decode a black and white pattern in string, the black and white pattern being created by binarizing electric signals corresponding to optical information, the optical information being obtained by optical readout of the barcode, the black and white pattern being composed of pieces of digital data corresponding to bars in black and white;

set a plurality of check lines on one external side region of at least one of both ends of the black and white pattern at different points in a height direction of the black and white pattern, respectively, the check lines extending outwardly from the at least one of both ends of the black and white pattern, the height direction being orthogonal to a length direction of the black and white pattern; and determine whether a predetermined margin is ensured along individually each of the check lines.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with reference to the accompanying drawings.

First Embodiment

Figure 1:
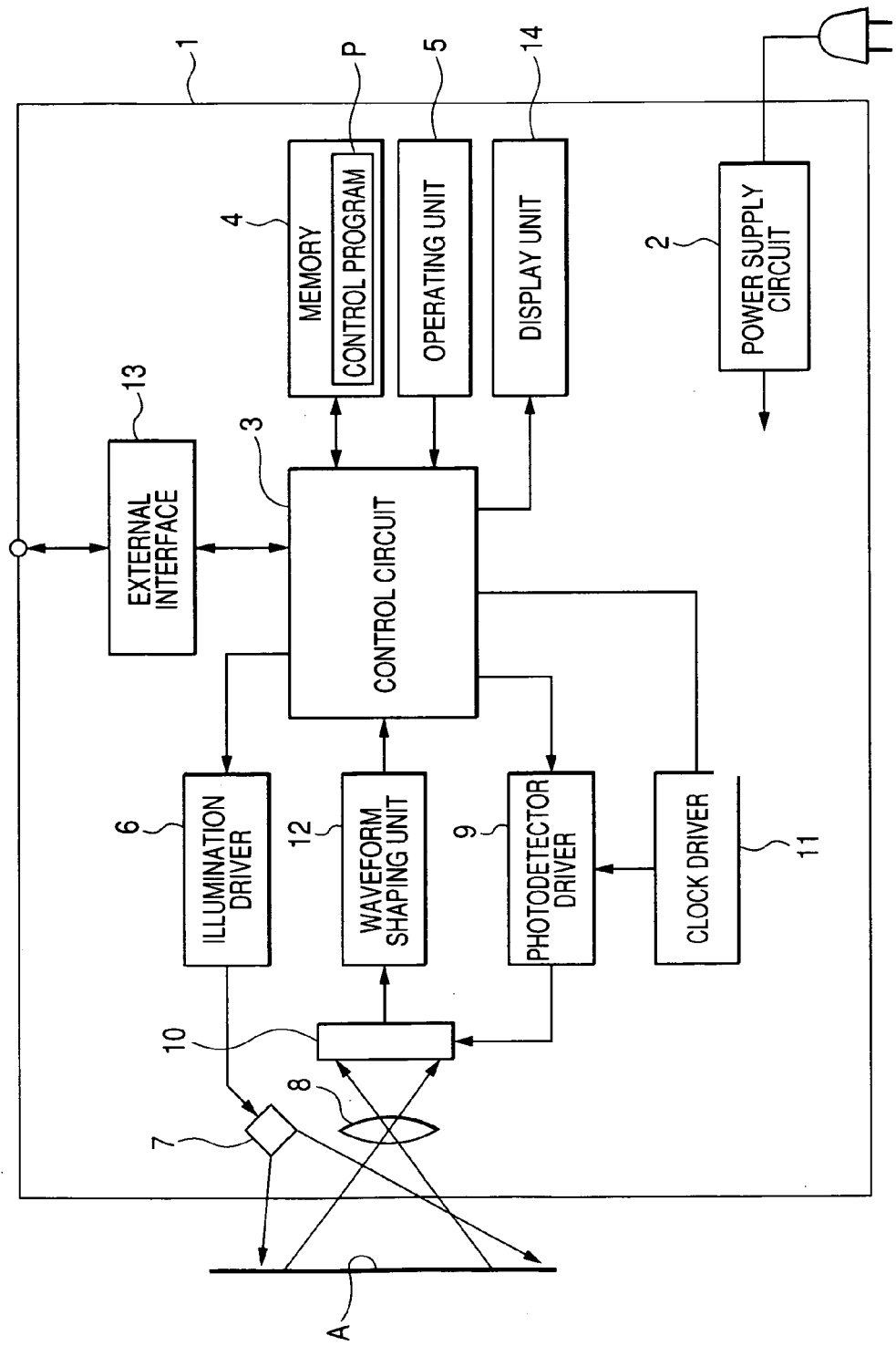
FIG. 1 is a block diagram schematically illustrating an example of the electrical structure of a barcode reader according to a first embodiment of the present invention.

FIG. 1 is a block diagram schematically illustrating an example of the electrical structure of a barcode reader 1 as an example of an apparatus for optically reading out information stored in a barcode according to a first embodiment of the present invention. Specifically, the barcode reader 1 is capable of reading a plurality of symbologies of barcodes; these symbologies of barcodes are specified by a user as targets of the barcode reader 1.

As shown in FIG. 1, the barcode reader 1 is operative to optically read out information stored in a barcode with a given symbology printed on a target A. The barcode is normally composed of a symbol together with margins (quiet zones) located at both ends thereof. The symbol is an area composed of black bars and spaces (while bars), and the margins means spaces, normally white, where nothing printed are required at each end of the barcode and they should be 10 times that of the narrowest width of a bar or space in the barcode. The narrowest width of a bar or space in a barcode, or a bar or a space with the narrowest width in a barcode is referred to as module.

For example, as one target symbology, UPC (Universal Products Code)-A (Version A) of barcodes substantially equivalent to EAN (European Article Number)-13 barcodes require numeric data with 11 digits (EAN-13: 12 digits); employs modulus 10 check digit. The UPC-A (EAN-13) barcodes are multi-level barcodes such that they have two black bars and two spaces by character. The UPC-A (EAN-13) barcodes are four-level codes such that a bar or a space can have a width of any one of 1, 2, 3, and 4 modules. Specifically, POS (Point-of-Sale) codes collectively represent symbologies UPC-A, UPC-E (Version E), EAN-13, and EAN-8 of barcodes.

Moreover, as another one target symbology, RSS (Reduced Space Symbology)_Limited barcodes are also multi-level barcodes such that they are seven black bars and seven spaces (26 modules) by character.

The barcode reader 1 is provided with a power supply circuit 2, a control circuit 3, a memory 4, and an operating unit 5.

The barcode reader 1 is also provided with an illumination driver 6, a light illuminating device 7, an imaging unit 8, a photodetector driver 9, a photodetector 10, a clock driver 11, a waveform shaping unit 12, an external interface 13, and a display unit 14.

The power supply circuit 2 preferably includes an AC/DC converter operative to convert AC power externally supplied thereto into DC power. The AC/DC converter is operative to feed the converted DC power to the elements of the reader 1 requiring power. Note that the power supply circuit 2 is provided as needed. For example, if the barcode reader has a handheld structure, the power supply circuit can be omitted because a battery with which the handheld barcode reader is integrated can drive the elements thereof.

The control circuit 3 is composed of, for example, at least one microcomputer. The control circuit 3 is accessible to the memory 4. A control program P has been stored in the memory 4, so that the control circuit 3 controls the whole of the reader 1 in accordance with the control program P, which will be described hereinafter.

The operating unit 5 is electrically connected to the control circuit 3. The operating unit 5 includes various operable setting keys, such as a trigger key, a numerical key, and the like. For example, press of the trigger key by a user or the like allows the barcode reader 1 to initiate a process based on control of the control circuit 3.

The illumination driver 6 is electrically connected to the control circuit 3 and operative to supply drive signals to the light illuminating device 7 based on control of the control circuit 3.

The light illuminating device 7 is composed of, for example, a light emitting diode (LED) and is electrically connected to the illuminating driver 6. The light illuminating device 7 is operative to irradiate illuminating light to the target A every time the driving signals are given thereto.

The imaging unit 8 is for example composed of an imaging lens. When the illuminating light emitted from the light illuminating device 7 is irradiated to the target A so that light reflected from the target A enters into the imaging unit 8, the imaging unit 8 focuses the reflected light on a light sensitive area (pixel area) of the photodetector 10.

The photodetector 10 is also referred to as an area sensor. Specifically, the photodetector 10 is composed of a plurality of light-sensitive elements, such as CCDs (Charge Coupled devices) arranged horizontally vertically in matrix to provide the pixel area. The control circuit 3 is operative to set a pick-up target area in the pixel area of the light-sensitive elements of the photodetector 10. Drives of at least some of the light-sensitive elements of the photodetector 10, which belong to a pick-up target area, can be individually controlled by the photodetector driver 9 and the control circuit 3. The pick-up target area can be determined by the control circuit 3 depending on a variable pick-up mode.

In addition, the imaging unit 8 and the photodetector 10 have a predetermined FOV (Field of View) such that the barcode reader 1 can pick up image of the target A when the target A is located within the FOV.

Specifically, the reflected light focused on each of at least some of the light-sensitive elements of the photodetector 10 is converted into an electric signal (pixel signal). Exposure times (shutter speeds) of the light-sensitive elements are settable by the control circuit 3.

When the control circuit 3 controls the photodetector driver 9 to drive the photodetector 10, each of at least some of the light-sensitive elements of the photodetector 10 gives the pixel signal to the waveform shaping unit 12. The photodetector driver 9 is operative to give clocks to the photodetector 10. The clocks allow each of at least some of the light-sensitive elements to output the pixel signal.

The waveform shaping unit 12 is operative to amplify the pixel signal output from each of at least some of the light-sensitive elements of the photodetector 10 at a predetermined gain. The waveform shaping unit 12 is also operative to supply, to the control circuit 3, the amplified pixel signals each with an intensity level depending on intensity of the illuminating light of a corresponding to pixel (light-sensitive element).

Specifically, the intensity level of each of the pixel signals represents the symbology of the barcode printed on the target A. The gain of the waveform shaping unit 12 can be set by the control circuit 3.

The external interface 13 is operative to allow communications between the control circuit 3 and external devices.

Next, operations of the barcode reader 1 will be described hereinafter with reference to FIGS. 2 and 3 in addition to FIG. 1.

Figure 2:
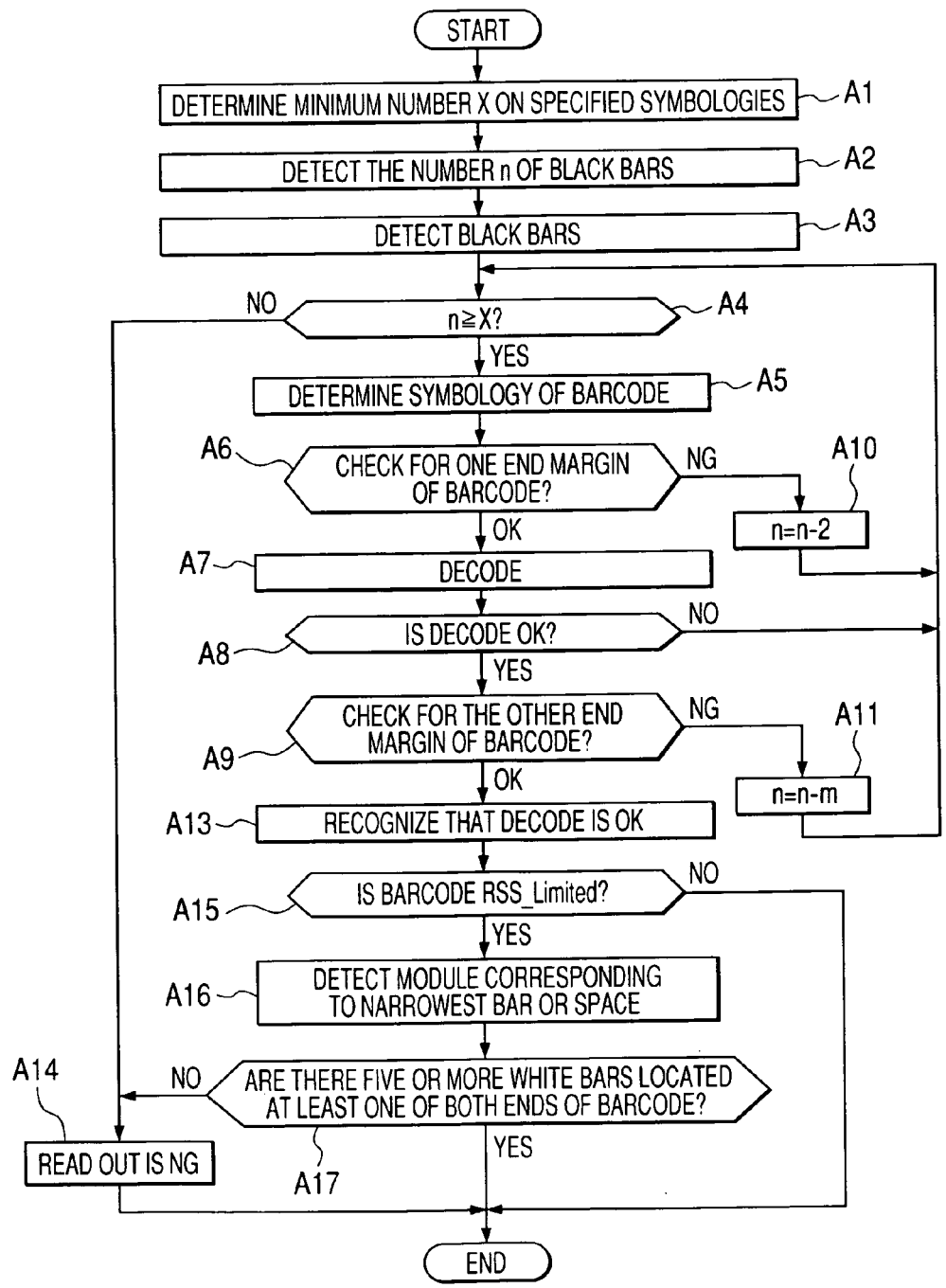
FIG. 2 is a flowchart schematically illustrating flow of operations executed by a control circuit when the control circuit runs a control program according to the first embodiment.

FIG. 2 schematically illustrates flow of operations executed by the control circuit 3 when the control circuit 3 runs the control program P. The flow of operations executed by the control circuit 3 is associated with the scope of the first embodiment of the present invention.

Specifically, the control circuit 3 determines a minimum number X of bars readable by the barcode reader 1 based on the specified symbologies of barcodes in step A1 of FIG. 2. Next, the control circuit 3 receives the intensity level signals of the barcode optically read out by the photodetector 10 and sent therefrom through the waveform shaping unit 12. Then, the control circuit 3 binarizes the intensity level signals to create a black and white pattern in string with "digital data 1" and "digital data 0"; "digital data 1" means black, and "digital data 0" means white. Next, the control circuit 3 clips the code region based on the dark (black) and bright (white) pattern, and detects the number n of black bars and the widths of the black bars based on the black and white pattern in steps A2 and A3.

Subsequently, the control circuit 3 compares the number n of black bars with the minimum number X of bars in step A4. If it is determined that the number n of black bars is equal to or greater than the minimum number X of bars (the determination in step A4 is YES), the control circuit 3 determines the symbology of the barcode printed on the target A based on the number n of black bars in step A5. Otherwise, if the number n of black bars is less than the minimum number X of bars (the determination in step A4 is NO), the control circuit 3 determines that readout of the barcode is NG in step A14.

After the affirmative determination in step A4, the control circuit 3 checks for one end side margin of the barcode. For example, the control circuit 3 refers to the width of the first white bar (space) at the one end side of the barcode and/or to the pattern of the first character at the one end side of the barcode. Next, the control circuit 3 determines whether there is presence or absence of the one end side margin using the determined symbology of the barcode in step A6.

If it is determined that there is the margin at one end side of the barcode, which is stipulated by the determined symbology of the barcode (the determination in step A6 is YES), the control circuit 3 employs a readout algorism corresponding to the determined symbology of the barcode to decode it in step A7 (the first process).

Otherwise, if no margin is located at one end side of the barcode even though the margin is stipulated by the determined symbology of the barcode (the determination in step A6 is NO), the control circuit 3 subtracts one black bar at each side of the barcode from the number n of black bars thereof (n=n−2 in step A10), returning to step A4. In step A4, the control circuit 3 compares the number n of black bars of the remaining portion of the barcode with the minimum number X of bars again.

After the step A7, the control circuit 3 determines whether the decode result is OK using, for example, a check digit (an extra character appended to one end of the barcode) in step A8. If it is determined that the decode result is OK (the determination in step A8 is YES), the control circuit 3 checks for the other end side margin of the barcode.

For example, the control circuit 3 refers to the width of the last white bar (space) at the other end side of the barcode with respect to the last black bar and/or to the pattern of the last character at the other end side of the barcode. Then, the control circuit 3 determines whether there is presence or absence of the other end side margin using the determined symbology of the barcode in step A9.

If it is determined that the decode result is NG (the determination in step A8 is NO), the control circuit 3 subtracts the number m of black bars, which is processed by the target of decode in step A7, from the number n of black bars of the barcode (n=n−m in step A10), returning to step A4. In step A4, the control circuit 3 compares the number n of black bars of the remaining portion of the barcode with the minimum number X of bars again.

If it is determined that there is presence of the other end side margin using the determined symbology of the barcode (the determination is step A9 is OK), the control circuit 3 recognizes that the decode is OK in step A13. Otherwise, if it is determined that there is absence of the other end margin (the determination in step A9 is NG), the control circuit 3 shifts to step A11 and repeatedly executes the operation therein.

In addition, after the operation in step A13, the control circuit 3 performs the operations in steps A15 to A17, which are characteristics of the first embodiment.

Specifically, the control circuit 3 determines whether the determined symbology of the barcode is RSS_Limited (the second symbology; the second barcode) in step A15 (the second process). If it is determined that the determined symbology is not the RSS_Limited (the determination in step A15 is NO), the control circuit 3 exits the operations.

In contrast, if it is determined that the determined symbology is the RSS_Limited (the determination in step A15 is YES), the control circuit 3 detects a module corresponding to the narrowest bar or space in the barcode based on the decoded result in step A7 in step A16. Next, the control circuit 3 determines whether there are five or more white bars at external side of at least one of both ends of the barcode in step A17.

The operation in step A17 will be described hereinafter in detail with reference to FIG. 3.

Figure 3:
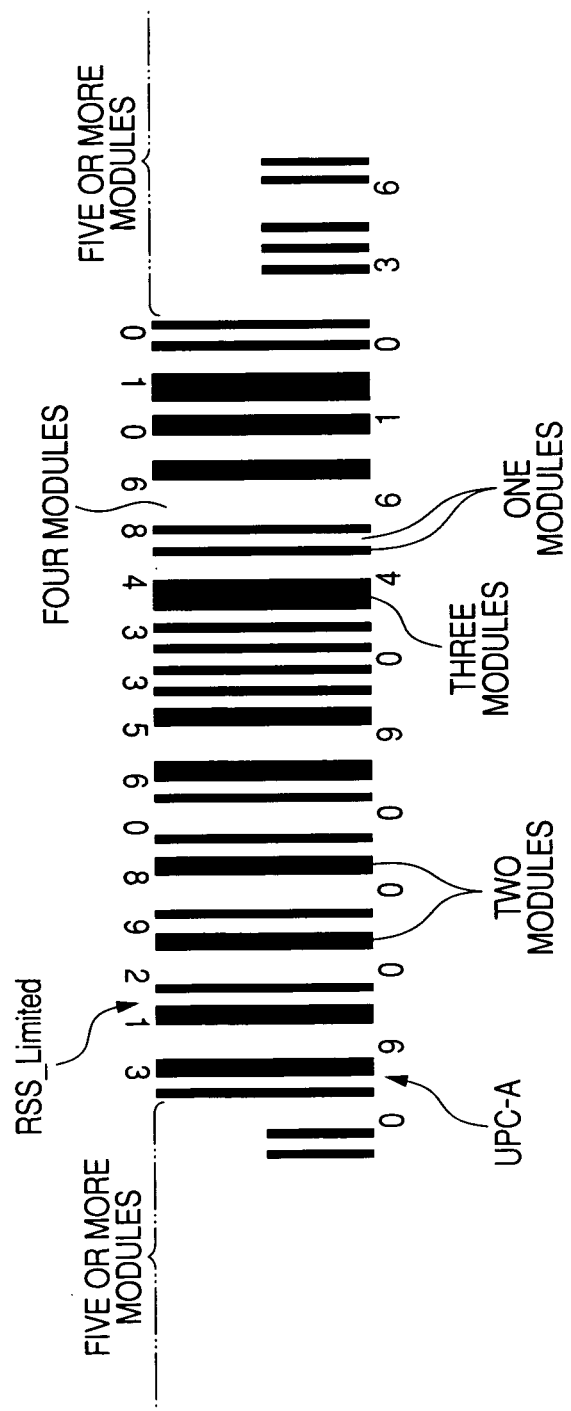
FIG. 3 is a view schematically illustrating an example of a barcode pattern of an RSS_Limited barcode and that of a UPC-A barcode according to the first embodiment.

FIG. 3 schematically illustrates an example of a barcode pattern of an RSS_Limited barcode and that of a UPC-A (Version A) barcode (first barcode with a first symbology) that is a type of POS codes.

In FIG. 3, the RSS_Limited barcode pattern and the UPC-A barcode pattern part of which coincides with the RSS_Limited barcode pattern are illustrated to be vertically arranged such that each bar and space of the RSS_Limited barcode pattern is accurately aligned with that of the UPC-A barcode pattern.

Specifically, the symbology of the RSS_Limited barcode is smaller than the UPC-A barcode pattern in code-size, in other words, the number of bars of the RSS_Limited barcode is smaller than that of bars of the UPC-A barcode pattern. In addition, in the symbology of the RSS_Limited barcode pattern, margins at both of external sides thereof are not required.

For these reasons, when reading out the UPC-A/EAN-13 barcode pattern, the barcode may be erroneously determined as the RSS_limited barcode depending on the state of scanning the UPC-A/EAN-13 barcode.

In order to avoid the erroneous determination, in step S17, if there is a margin (margin region) composed of five or more white bars located at at least one of both ends of the barcode, the control circuit 3 can determine that the decode result obtained by regarding the barcode as the RSS_limited barcode is OK.

Specifically, because each of bars and spaces constituting the UPC-A/EAN-13 barcode has a width of any one of 1, 2, 3, and 4 modules, a bar or a space has a width of five or more modules does not constitute part of the UPC-A/EAN-13 barcode. If there are five or more white bars located at at least one of both ends of the barcode, the control circuit 3 therefore can determine that the decode result obtained by regarding the barcode as the RSS_limited barcode is OK.

In contrast, in step A17, if there are four or less white bars located at at least one of both ends of the barcode, the control circuit 3 determines whether there are five or more black bars located at at least one of both ends of the barcode. If there are four or less black bars located at at least one of both ends of the barcode, the determination in step S17 is NO, so that the control circuit 3 recognizes that the decoded barcode pattern may be part of the UPC-A/EAN-13 barcode. The control circuit 3 therefore shifts to step A14 and determines that the decode result is NG.

Note that, in the first embodiment, in step A17, the determination operation associated with the white bars is performed first, and next the determination operation associated with the black bars is performed. This is because each barcode is normally provided with at its both ends with black bars so that margins located outside of the both ends of the black bars, respectively. Perform of the determination operation associated with the white bars first can make the control circuit 3 more appropriately responsive to almost barcodes, thereby immediately determining that the decode result is OK or NG.

As described above, in the first embodiment, when the decode of an RSS_Limited barcode is accurately completed, the control circuit 3 of the barcode reader 1 determines whether there are a predetermined number and over white bars larger than the maximum width of a bar in a UPC-A/EAN-13 barcode located at at least one of both ends of the barcode. When being determined that there are a predetermined number and over of white bars larger than the maximum width of a bar in a UPC-A/EAN-13 barcode located at at least one of both ends of the barcode, it is possible to determine the readout barcode as the RSS_Limited barcode. Even if the barcode coincides with part of another barcode, such as a POS code, it is possible to prevent the barcode from being decoded as another barcode.

Second Embodiment

A second embodiment of the present invention will be described hereinafter. A barcode reader according to the second embodiment has substantially the same hardware structure as the barcode reader 1 according to the first embodiment. For this reason, descriptions of the hardware structure of the barcode reader according to the second embodiment are omitted.

In the second embodiment, a control program installed in the memory 4 is partially different from that of the first embodiment, so that flow of operations executed by the control circuit 3 when the control circuit 3 runs the control program is partially different from that of operations executed by the control terminal 3 according to the first embodiment. These different points of the second embodiment against the first embodiment will be mainly described hereinafter.

Figure 4:
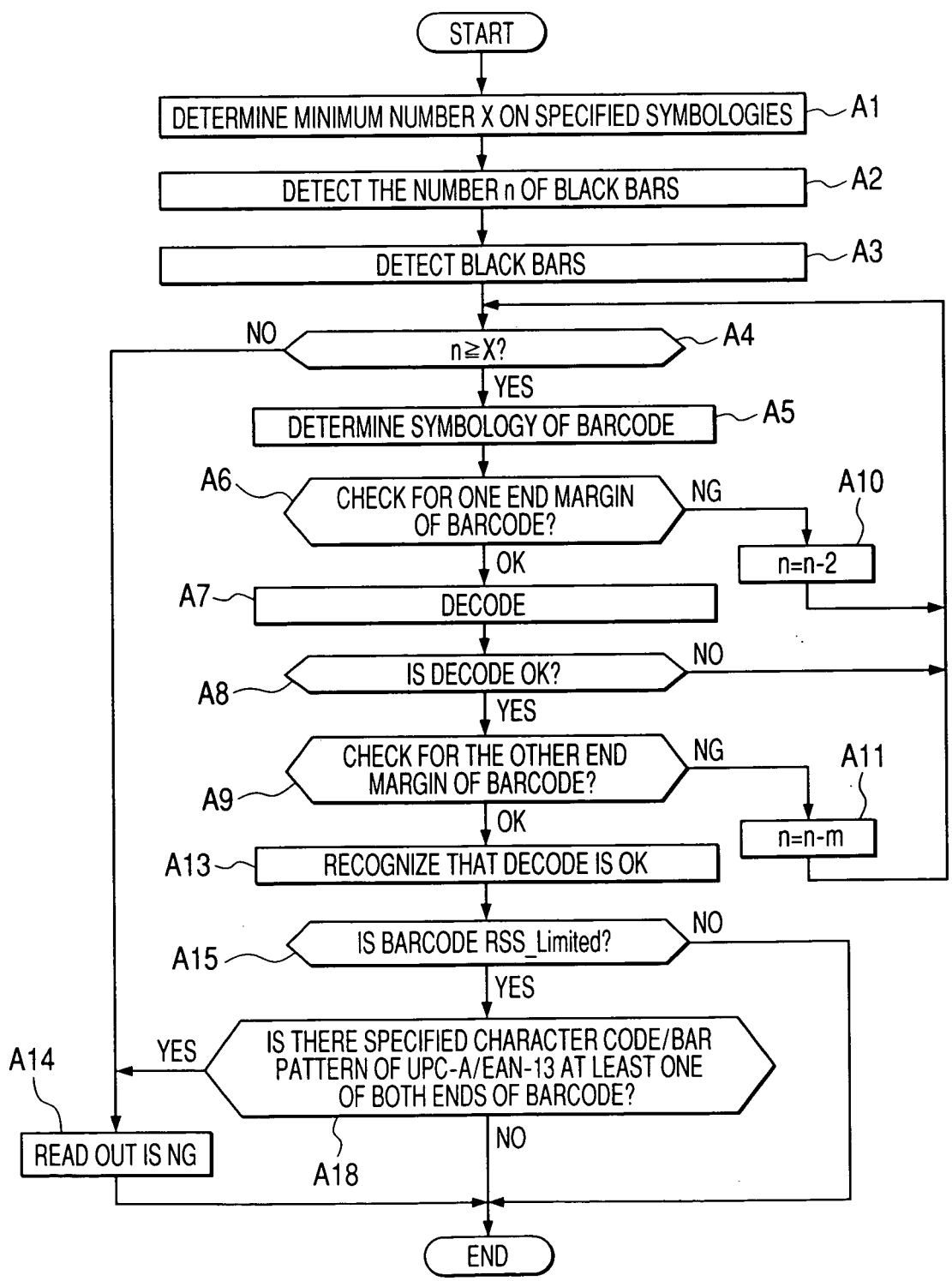
FIG. 4 is a flowchart schematically illustrating flow of operations executed by a control circuit when the control circuit runs a control program according to a second embodiment of the present invention.

FIG. 4 schematically illustrates the flow of operations executed by the control circuit 3 when the control circuit 3 runs the control program according to the second embodiment.

The control circuit 3 executes the same operations as those in step A1 to A15, so that descriptions thereof are omitted.

Specifically, if it is determined that the determined symbology is the RSS_Limited (the determination in step A 15 is YES), the control circuit 3 determines whether there is a specified character code or bar pattern of the symbology of UPC-A/EAN-13 at at least one of both ends of the barcode in step A18.

If it is determined that there is not a specified character code or bar pattern of the symbology of UPC-A/EAN-13 at at least one of both ends of the barcode (the determination in step S18 is NO), the control circuit 3 determines that the decode result obtained by regarding the barcode as the RSS_limited barcode is OK.

Otherwise, if there is a specified character code or bar pattern of the symbology of UPC-A/EAN-13 at at least one of both ends of the barcode (the determination in step S18 is YES), the control circuit 3 shifts to step A14 and determines that the decode result is NG in step S14.

Figure 5:
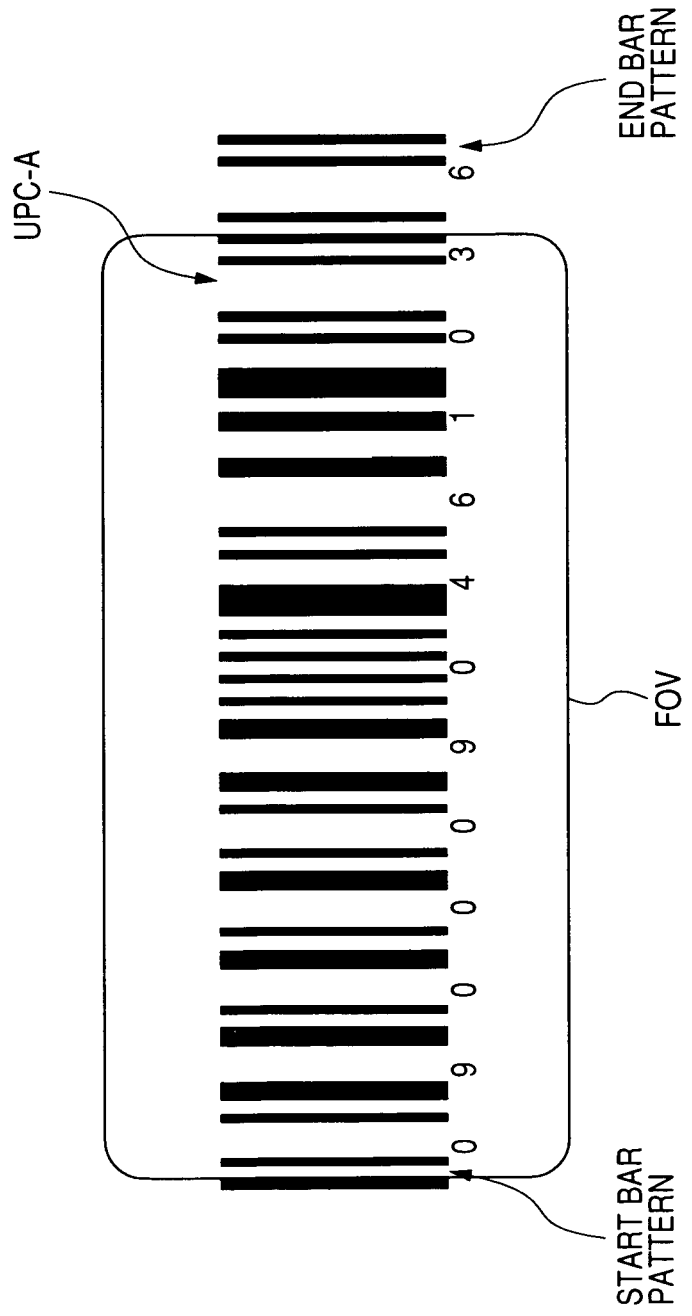
FIG. 5 is a view schematically illustrating a relationship between a barcode pattern of a UPC-A/EAN-13 barcode and an FOV of the barcode reader according to the second embodiment.

Specifically as illustrated in FIG. 5, when scanning the UPC-A/EAN-13 barcode by the barcode reader, in cases where the whole of the UPC-A/EAN-13 barcode extends beyond the FOV of the barcode reader, the readout result of part of the UPC-A/EAN-13 barcode may coincide with the code pattern of the RSS_Limited barcode.

In these cases, because the UPC-A/EAN-13 barcode is provided at its one end with a specified start bar pattern and it's the other end with a specified end bar pattern, if it is determined that there is a specified bar pattern at at least one of both ends of the barcode, the control circuit 3 can estimate that the readout barcode is a UPC-A/EAU-13 barcode. The control circuit 3 therefore determines that the decode result obtained by regarding the barcode as the RSS_Limited barcode is NG, making it possible to prevent decode error of the barcode.

In the second embodiments, in cases where other symbologies of barcodes in place of the UPC-A/EAU-13 barcodes include at its one end with a specified start character code (start pattern) and it's the other end with a specified end character code (end pattern). For this reason, it is possible to estimate that the readout barcode is one of the other symbologies of barcodes when it is determined that there is a specified character code at at least one of both ends of the barcode.

Third Embodiment

A third embodiment of the present invention will be described hereinafter. A barcode reader according to the third embodiment has substantially the same hardware structure as the barcode reader 1 according to the first embodiment. For this reason, descriptions of the hardware structure of the barcode reader according to the third embodiment are omitted.

In the third embodiment, a control program installed in the memory 4 is partially different from that of the first embodiment, so that flow of operations executed by the control circuit 3 when the control circuit 3 runs the control program is partially different from that of operations executed by the control circuit 3 according to the first embodiment. These different points of the third embodiment against the first embodiment will be mainly described hereinafter.

Figure 6:
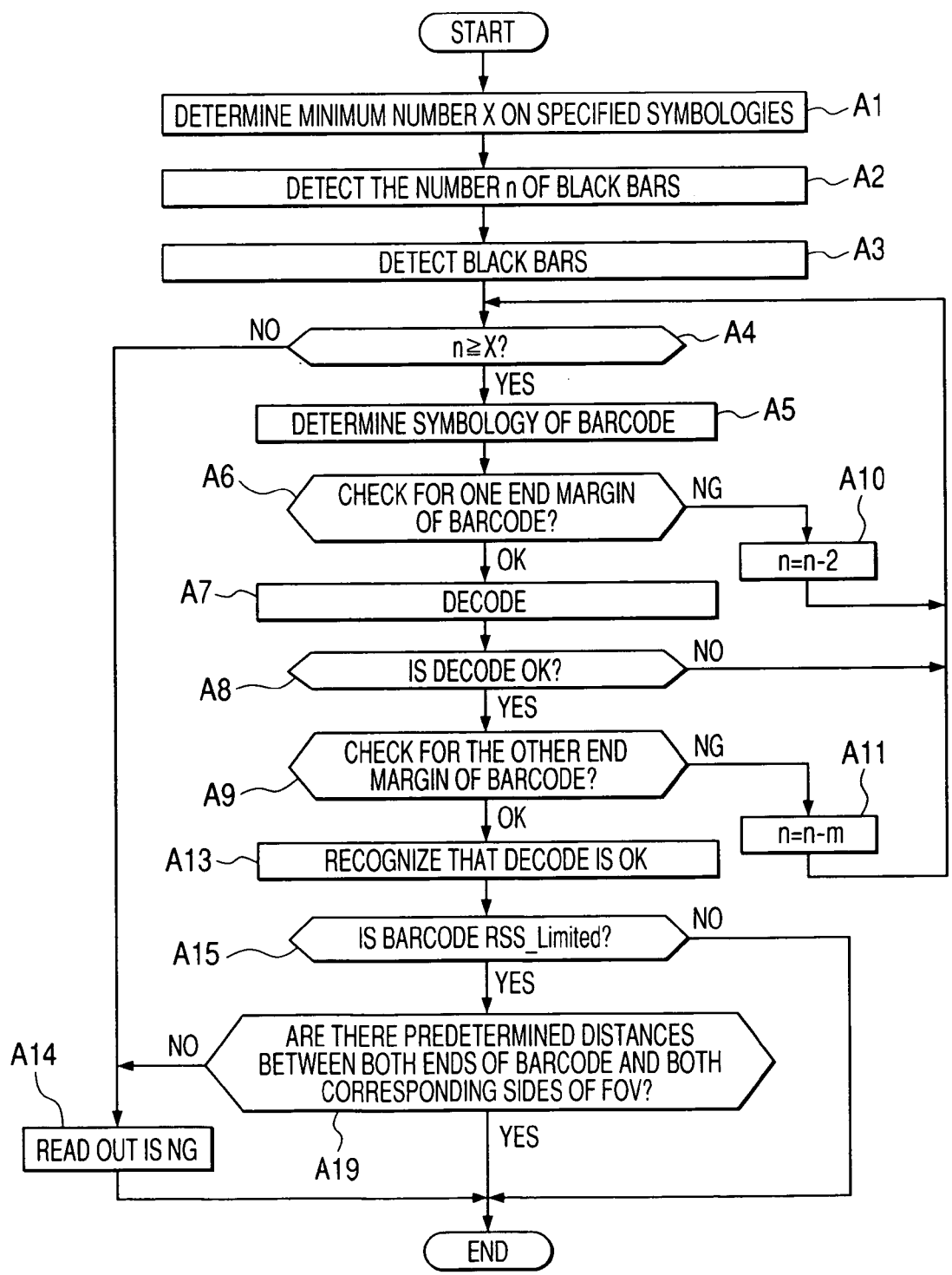
FIG. 6 is a flowchart schematically illustrating flow of operations executed by a control circuit when the control circuit runs a control program according to a third embodiment of the present invention.

FIG. 6 schematically illustrates the flow of operations executed by the control circuit 3 when the control circuit 3 runs the control program according to the third embodiment.

The control circuit 3 executes the same operations as those in step A1 to A15, so that descriptions thereof are omitted.

Specifically, if it is determined that the determined symbology is the RSS_Limited (the determination in step A15 is YES), the control circuit 3 determines whether there are predetermined distances between both ends of the barcode located within the FOV and both corresponding sides of the FOV in step A19.

If it is determined that there are predetermined distances between both ends of the barcode located within the FOV and both corresponding sides of the FOV (the determination in step S19 is YES), the control circuit 3 determines that the decode result obtained by regarding the barcode as the RSS_limited barcode is OK.

Otherwise, if there are not predetermined distances between both ends of the barcode located within the FOV and both corresponding sides of the FOV (the determination in step S19 is NO), the control circuit 3 shifts to step A 14 and determines that the decode result is NG in step S14.

Figure 7:
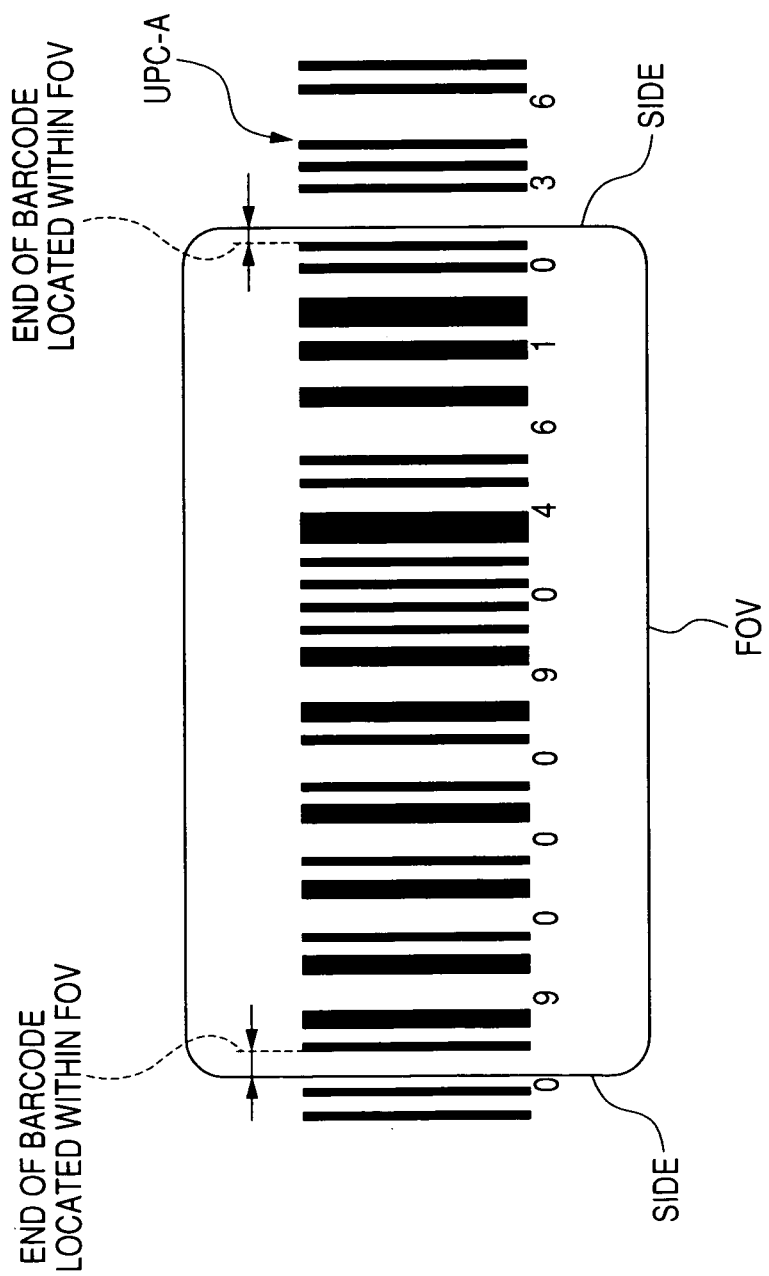
FIG. 7 is a view schematically illustrating a relationship between a barcode pattern of a UPC-A/EAN-13 barcode and an FOV of the barcode reader according to the third embodiment.

Specifically as illustrated in FIG. 7, when scanning the UPC-A/EAN-13 barcode by the barcode reader, in cases where the whole of the UPC-A/EAN-13 barcode extends beyond the FOV of the barcode reader, the readout result of part of the UPC-A/EAN-13 barcode on the inner peripheral edge of the FOV may coincide with the code pattern of the RSS_Limited barcode.

In these cases where the whole of the UPC-A/EAN-13 barcode extends beyond the FOV of the barcode reader, in other words, when there are not predetermined distances between both ends of the barcode located within the FOV and both corresponding sides of the FOV, the control circuit 3 determines that the decode result obtained by regarding the barcode as the RSS_Limited barcode is NG. This makes it possible to prevent decode error of the barcode.

It is assumed that the barcode is actually the RSS_limited barcode even through the whole of the RSS_limited barcode extends beyond the FOV, which is different from the situation illustrated in FIG. 7. In this assumption, the intensity of the illuminating light on the inner peripheral edge of the FOV is lower than that of the illuminating light on the remaining portion of the FOV. For this reason, accurate binarization of the intensity level signals of photodetector's pixels corresponding to the inner peripheral edge of the FOV may be difficult. In these cases where the whole of the barcode extends beyond the FOV of the barcode reader, therefore, the decode result obtained by regarding the barcode as the RSS_Limited barcode is always determined as NG. This makes it possible to avoid decode error of the barcode.

Fourth Embodiment

A fourth embodiment of the present invention will be described hereinafter with reference to FIGS. 8 to 11. A barcode reader according to the fourth embodiment has substantially the same hardware structure as the barcode reader 1 according to the first embodiment. For this reason, descriptions of the hardware structure of the barcode reader according to the fourth embodiment are omitted.

In the fourth embodiment, a control program installed in the memory 4 is partially different from that of the first embodiment, so that flow of operations executed by the control circuit 3 when the control circuit 3 runs the control program is partially different from that of operations executed by the control circuit 3 according to the first embodiment. These different points of the fourth embodiment against the first embodiment will be mainly described hereinafter.

Specifically, the forth embodiment relates to the margin check operations in step A6 or A9 of FIG. 2 according to the first embodiment.

First, problems that may appear when subjecting margin check operations to the readout barcode pattern will be described hereinafter with reference to FIGS. 8 to 10A.

When scanning the barcode using an area sensor, an area in which the readout barcode pattern is located is extracted from the readout image of the target A, and one scanning line is drawn on the extracted area. The scanning of the barcode is performed along the at least one scanning line thereon.

Figure 8:
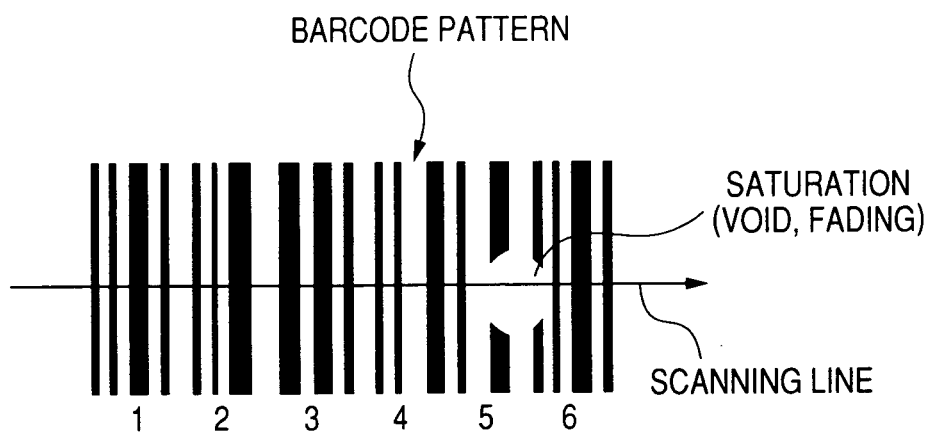
FIG. 8 is a view schematically illustrating saturation (void, fading, or the like) appearing in a barcode pattern of a barcode according to the third embodiment.
Figure 9:
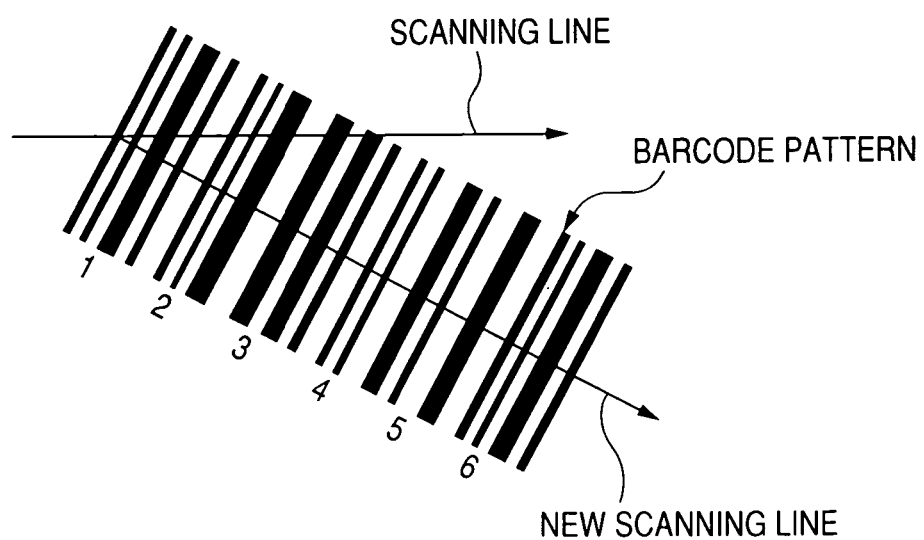
FIG. 9 is a view schematically illustrating a situation in which the length direction of a barcode across the bars and spaces is inclined with a scanning line in two-dimensions to be out of the barcode at the middle thereof.

As illustrated in FIG. 8 as one example, part of a black bar on the scanning line may be saturated white due to specular reflection. Moreover, a void and/or fading may appear in a black bar on the scanning line due to inferior print quality of the barcode on the label.

These saturation, void and/or fading on a black bar on which the scanning line is drawn may cause the control circuit to erroneously determine these portions as margin regions. This may cause digit drops and/or readout errors to occur in the decoded result of the barcode.

Moreover, the barcode reader of each of the embodiments according to the invention can read a barcode in any direction. When scanning a barcode while the length direction of the barcode across the bars and spaces is inclined with the scanning line in two-dimensions, the scanning line may be out of the barcode at the middle thereof.

In order to avoid such situation, the control circuit 3 traces the extending direction of the black bat that the scanning line hits first, and obtains an angle of the extending direction of the black bar with respect to a horizontal direction (scanning reference direction). In addition, the control circuit 3 calculates a normal to the extending direction of the black bar, draws a new scanning line along the normal again on the barcode, and scans the barcode along the scanning line (see FIG. 9).

Figure 10A:
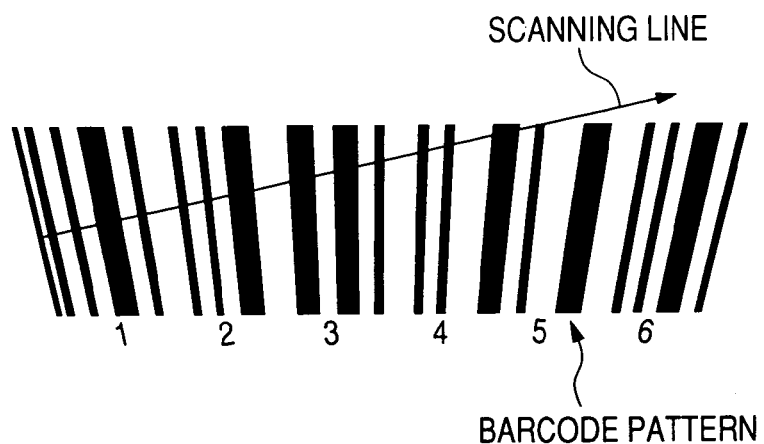
FIG. 10A is a view schematically illustrating a barcode pattern of a barcode, which is deformed like trapezoid.
Figure 10B:
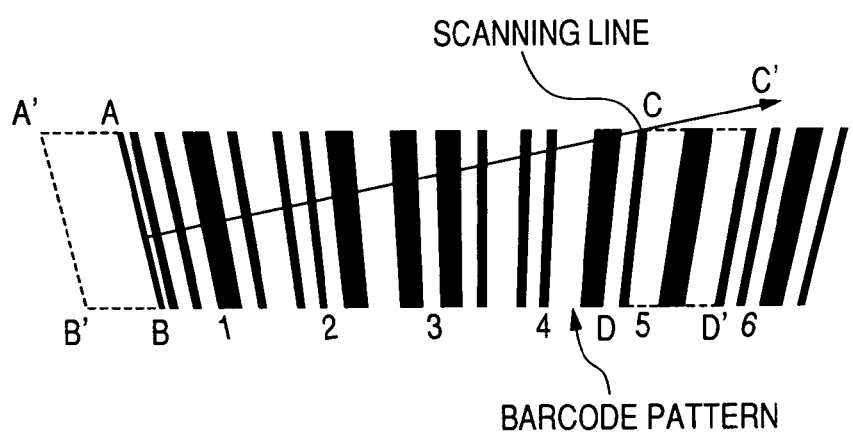
FIG. 10B is a view schematically illustrating margin regions set at external sides of both ends of an outline according to the fourth embodiment.
Figure 10C:
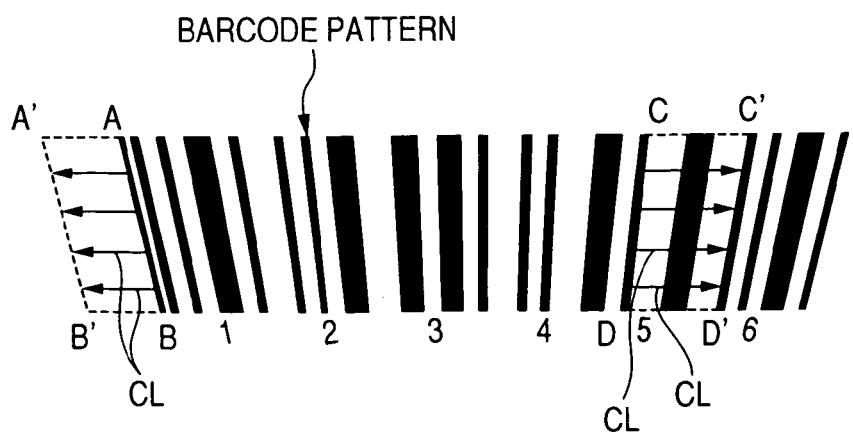
FIG. 10C is a view schematically illustrating a plurality of check lines according to the fourth embodiment.

When a barcode is scanned using an area sensor while there is an elevation angle or a depression angle of the area sensor with respect to a plane on which the barcode is attached (printed), as illustrated in FIG. 10A, the barcode pattern may be deformed like trapezoid. In this case, as illustrated in FIG. 10A, even if a new scanning line is drawn again along the normal to the extending direction of the black bar that the previous scanning line hits first, the new scanning line may also be out of the barcode at the middle thereof.

Figure 11:
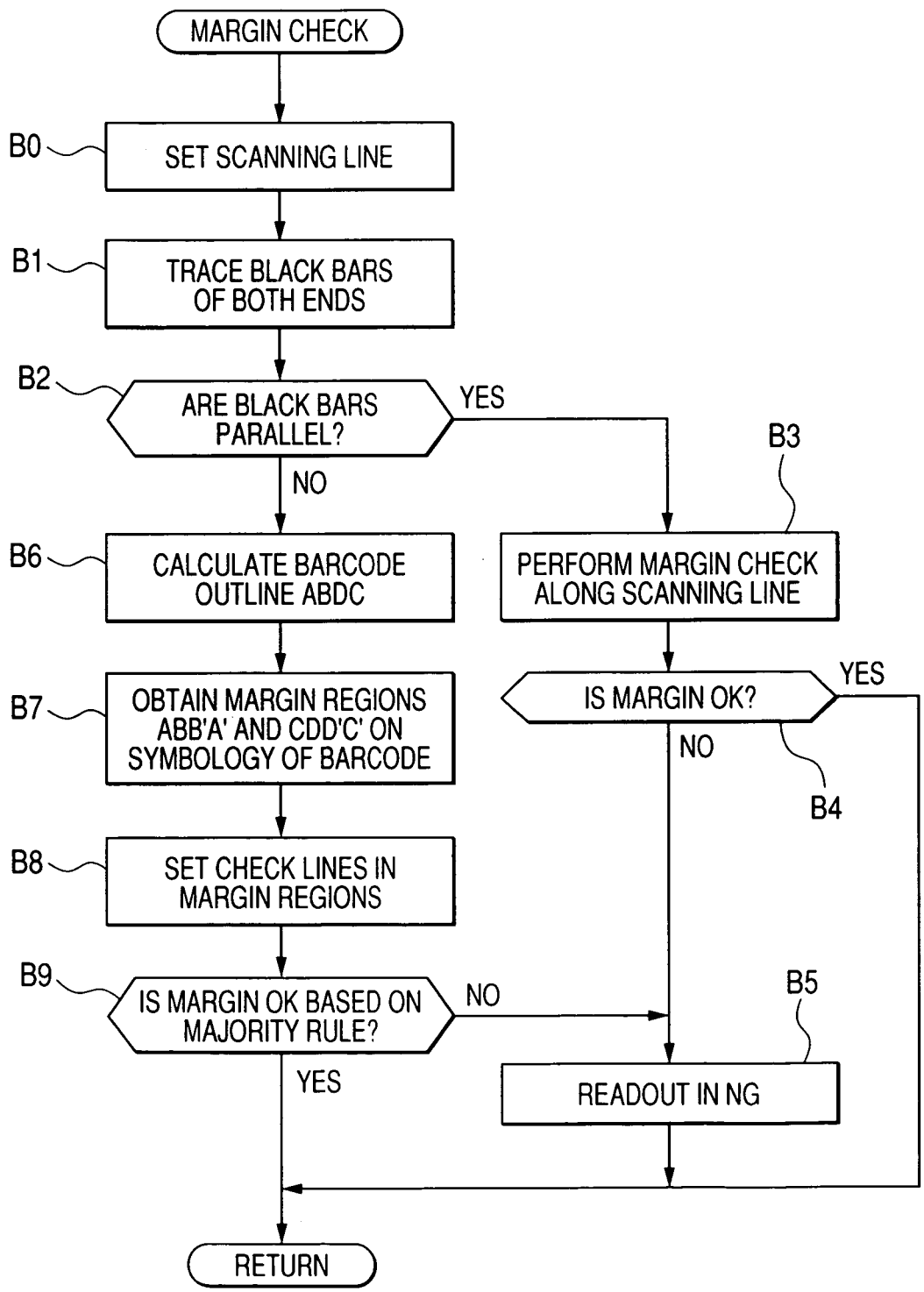
FIG. 11 is a flowchart schematically illustrating flow of operations executed by a control circuit when the control circuit runs a control program according to a fourth embodiment.

Thus, in the fourth embodiment, the control circuit 3 performs margin check operations in step A6 and/or step A9 in accordance with the following flowchart illustrated in FIG. 11.

Specifically, the control circuit 3 extracts an area in which the readout barcode pattern is located from the readout image of the target A, and draws one scanning line on the extracted area along the length direction of the barcode in step B0.

Next, the control circuit 3 traces the extending directions of black bars located at both ends of the readout barcode pattern in step B1, and determines whether the extending directions of the black bars located at both ends of the readout barcode pattern are parallel to each other in step B2.

If it is determined that the extending directions of the black bars are parallel to each other (the determination in step B2 is YES), the control circuit 3 performs margin check operations along the scanning line in step B3. If it is determined that there is the margin at one end side or the other end side of the barcode, which is stipulated by the determined symbology of the barcode (the determination in step B4 is YES), the control circuit 3 shifts to step A7. If otherwise (the determination in step B4 is NO), the control circuit 3 determines that readout of the margin is NG, shifting to step A10 or A11.

In contrast, if it is determined that the extending directions of the black bars are not parallel to each other (the determination in step B2 is NO), the control circuit 3 obtains an outline ABDC of the barcode pattern based on the scanning line (see FIG. 10B) in step B6. Next, the control circuit 3 calculates an amount of margin, which is stipulated by the determined symbology of the barcode, based on the outline ABDC. Then, the control circuit 3 obtains margin regions ABB'A' and CDD'C' based on the calculated amount of margin, and establishes the obtained margin regions ABB'A' and CDD'C' located at external sides of both ends of the outline ABDC in step B7 (see FIG. 10B).

Subsequently, the control circuit 3 sets a plurality of check lines CL on the margin regions ABB'A' and CDD'C' at different positions in the height direction of the barcode pattern so as to extend outwardly from both ends of the outline ABDC in, for example, parallel to the length direction of the barcode, respectively, in step B8. Thereafter, the control circuit 3 determines whether the amount of margin, which is stipulated by the determined symbology of the barcode, is ensured along individually each of the check lines CL in step B9.

More specifically, the control circuit 3, in step B8, sets three or more check lines CL on the margin regions ABB'A' and CDD'C', and, in step B9, determines whether the amount of margin, which is stipulated by the determined symbology of the barcode, is ensured along individually each of the three or more check lines CL. If it is determined that some of the check lines CL on the margin region ABB'A' each along which the amount of margin is ensured make up the majority in all of the check lines CL thereon, the control circuit 3 determines that the margin check at one end (ABB'A' side end) of the barcode is OK, shifting to step A7.

Otherwise, if some of the check lines CL on the margin region ABB'A' each along which the amount of margin is ensured does not make up the majority in all of the check lines CL thereon, the control circuit 3 determines that readout of the margin at one end (ABB'A' side end) of the barcode is NG, shifting to step A10.

Similarly, if it is determined that some of the check lines CL on the margin region CDBD'C' each along which the amount of margin is ensured make up the majority in all of the check lines CL thereon, the control circuit 3 determines that the margin check at the other end (CDD'C' side end) of the barcode is OK, shifting to step A13.

Otherwise, if some of the check lines CL on the margin region CDD'C' each along which the amount of margin is ensured does not make up the majority in all of the check lines CL thereon, the control circuit 3 determines that readout of the margin at the other end (CDD'C' side end) of the barcode is NG, shifting to step A11.

As described above, in the fourth embodiment of the present invention, when scanning the barcode using the photodetector 10 as an area sensor in two-dimension, a plurality of check lines CL are set to an external side of at least one of both ends of the barcode pattern at different positions in the height direction, respectively. In addition, whether the amount of margin, which is stipulated by the determined symbology of the barcode, is ensured along independently each of the plurality of check lines CL is determined.

Accordingly, when the barcode is scanned using the photodetector 10 while there is an elevation angle or a depression angle of the area sensor with respect to a plane on which the barcode is attached, both ends of the barcode pattern may be inclined with respect to a direction orthogonal to the length direction of the barcode, and/or the print quality of the barcode may deteriorate. In the fourth embodiment, even if these cases appear, it is possible to securely determine whether there is presence or absence of margin at at least one of both ends of the barcode pattern; this margin sufficiently meets the determined symbology of the barcode.

More particularly, in the fourth embodiment, three or more check lines CL are set to an external side of at least one of both ends of the barcode pattern, respectively, and whether the amount of margin, which is stipulated by the determined symbology of the barcode, is ensured along independently each of the three or more check lines CL is determined based on majority rule. This makes it possible to appropriately determine there is presence or absence of margin, which is stipulated by the determined symbology of the barcode, at at least one of both ends of the barcode pattern.

In addition, where the extending directions of the black bars located at both ends of the readout barcode pattern are parallel to each other is determined, and when the extending directions of the black bars located at both ends of the readout barcode pattern are not parallel to each other, a plurality of check lines are established as described above. In contrast, when the extending directions of the black bars located at both ends of the readout barcode pattern are parallel to each other, the margin check operations are performed along the scanning line. Set of the plurality of check lines only when scan of the barcode is carried out while the length direction of the barcode across the bars and spaces is assumed to be inclined with the scanning line in two-dimensions allows the barcode to be immediately decoded.

Fifth Embodiment

A fifth embodiment of the present invention will be described hereinafter with reference to FIGS. 12 and 13. A barcode reader according to the fifth embodiment has substantially the same hardware structure as the barcode reader 1 according to the first embodiment. For this reason, descriptions of the hardware structure of the barcode reader according to the fifth embodiment are omitted.

In the fifth embodiment, a control program installed in the memory 4 is partially different from that of the first embodiment, so that flow of operations executed by the control circuit 3 when the control circuit 3 runs the control program is partially different from that of operations executed by the control circuit 3 according to the first embodiment. These different points of the fifth embodiment against the first embodiment will be mainly described hereinafter.

Figure 12:
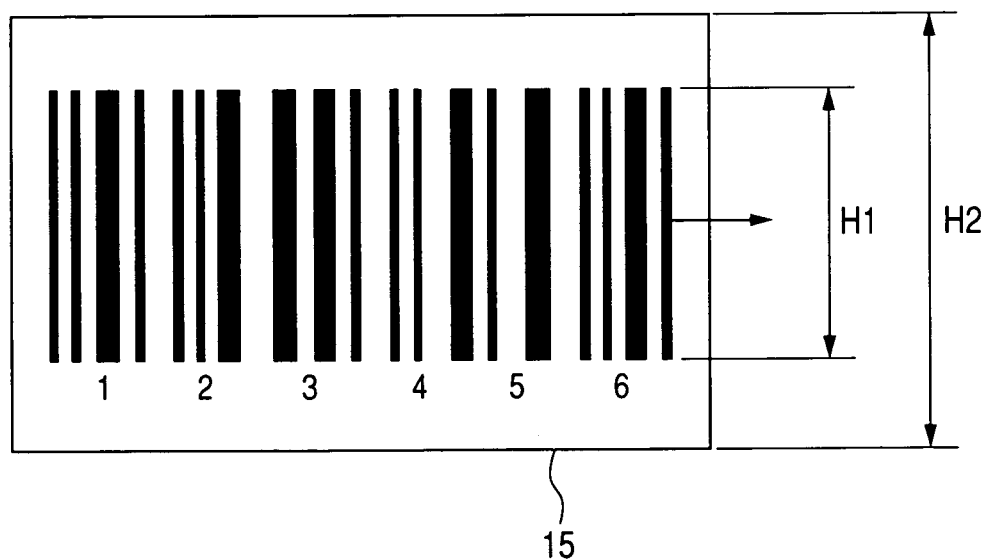
FIG. 12 is a view schematically illustrating a barcode printed on a label so as not to ensure stipulated margins with respect to a frame order of the label according to a fifth embodiment.

When attaching a barcode onto a limited area, such as a table, the barcode may be printed on a label 15 so as not to ensure stipulated margins with respect to the frame border of the label 15 (see FIG. 12).

The fifth embodiment of the present invention is capable of securely performing margin check of such a barcode.

Figure 13:
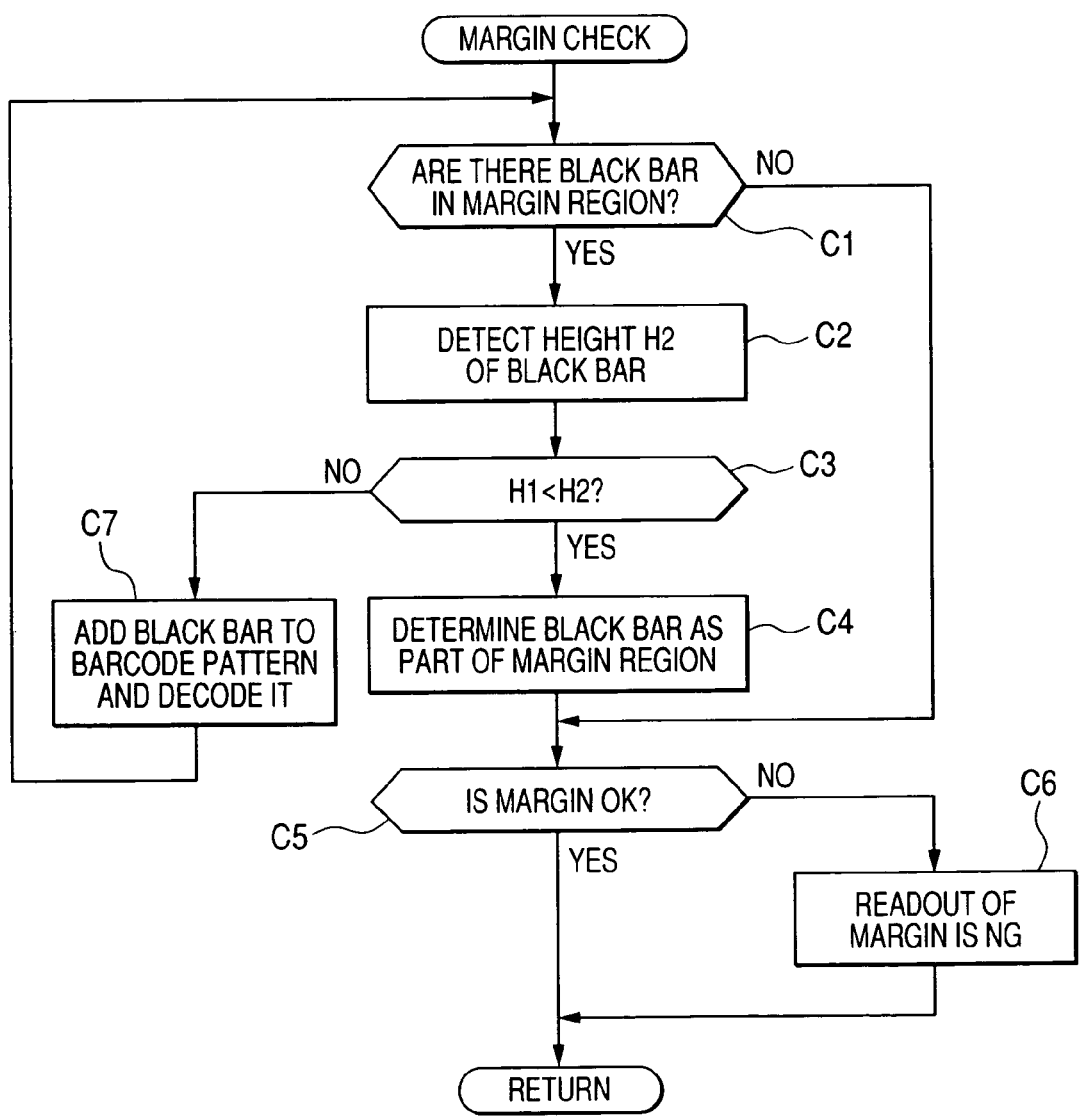
FIG. 13 is a flowchart schematically illustrating flow of operations executed by a control circuit when the control circuit runs a control program according to the fifth embodiment.
Figure 14:
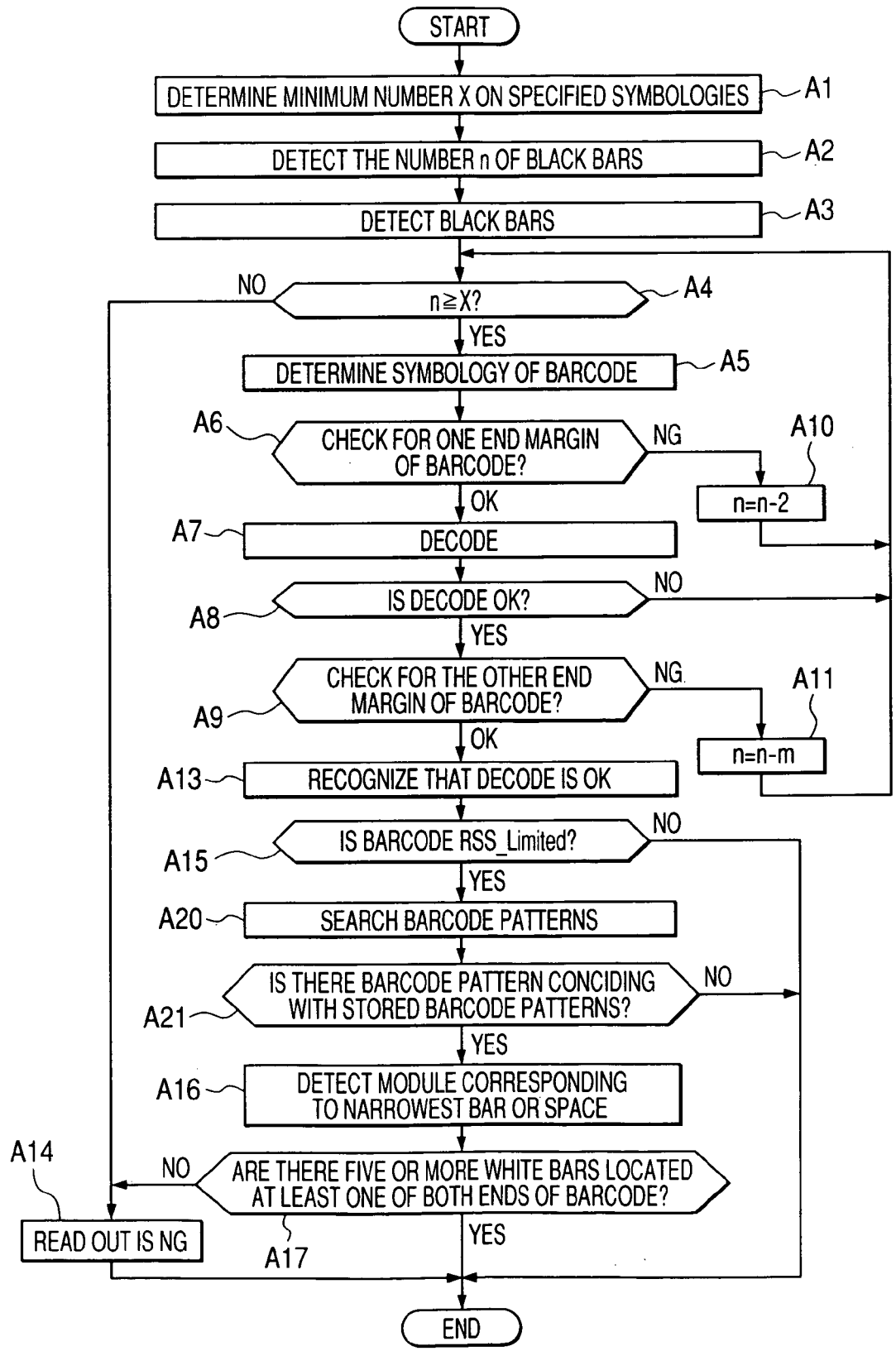
FIG. 14 is a flowchart schematically illustrating flow of operations executed by a control circuit when the control circuit runs a control program according to a sixth embodiment.
Figure 15:
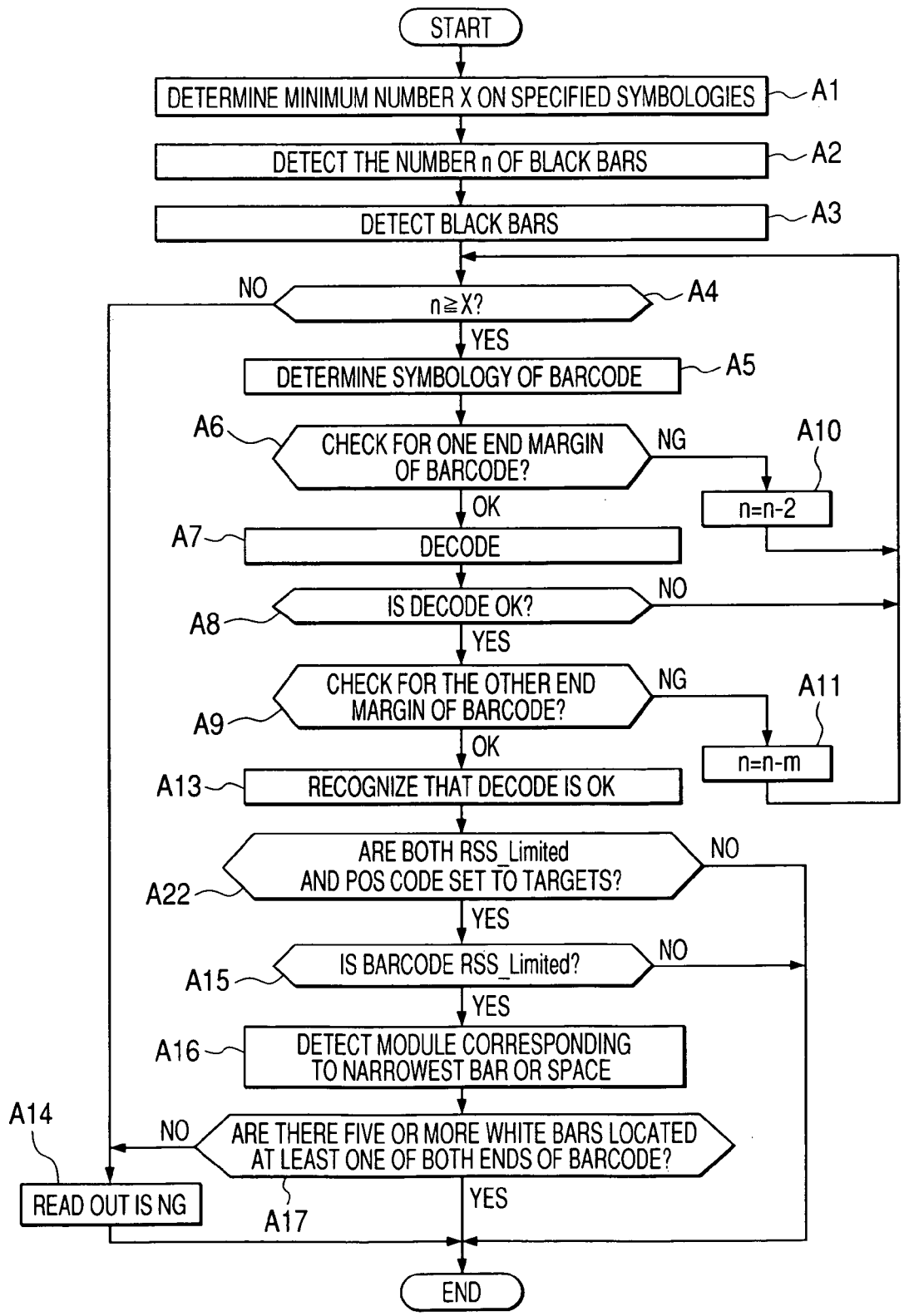
FIG. 15 is a flowchart schematically illustrating flow of operations executed by a control circuit when the control circuit runs a control program according to the sixth embodiment.

Specifically, in the fifth embodiment, the control circuit 3 performs margin check operations in step A6 and/or step A9 in accordance with the following flowchart illustrated in FIG. 13.

The control circuit 3 sets check lines in stipulated margin regions at external sides of both ends of a barcode pattern and determines whether there are black bars in the stipulated margin regions in step C1. Specifically, in the situation illustrated in FIG. 12, the operation in step C1 allows the frame border of the label 15 to be detected as the black bars.

If it is determined that there are no black bars in the stipulated margin regions (the determination in step C1 is NO), the control circuit 3 shifts to step C5 and performs margin check operations along the scanning line.

If it is determined that there is the margin at one end side or the other end side of the barcode, which is stipulated by the determined symbology of the barcode (the determination in step C5 is YES), the control circuit 3 shifts to step A7. If otherwise (the determination in step C5 is NO), the control circuit 3 determines that readout of the margin is NG in step C6, shifting to step A10 or A11.

In contrast, if it is determined that the there are black bars in the stipulated margin regions (the determination in step C1 is YES), the control circuit 3 traces the extending direction of each of the black bars to measure a height H2 of the label 15, in other words, a length of the label 15 parallel to each black bar in step H2. Thereafter, the control circuit 3 compares the detected height H2 with a height H1 of the barcode pattern, which has already been detected in step A6 as one example in step C3.

If it is determined that the height H2 is longer than the height H1 (the determination in step C3 is YES), the control circuit 3 can estimate that the black bars detected in step C1 do not constitute black bars of the barcode pattern, but constitute the frame border of the label 15. The control circuit 3 therefore determines that regions where the black bars are detected in step C1 are part of the margin regions in step C4, shifting to step C5.

In contrast, if it is determined that the height H2 is equal to or shorter than the height H1 (the determination in step C3 is NO), the control circuit 3 adds the black bars detected in step C1 to the code pattern and decodes the code pattern in step C7 (step A7), returning to step C1.

As set forth above, in the fifth embodiment, whether there are black bars in the stipulated margin regions are determined, and when there are black bars in the stipulated margin regions, the height H2 based on the detected black bars is compared with the height H1 of the barcode pattern, which has already been detected.

When the height H2 is longer than the height H1, the black bars detected in step C1 are determined to be part of the margin regions. If a barcode is printed on the label such that the stipulated margin regions are not ensured in the frame border of the label 15, it is possible to clearly discriminate a black bar of the barcode patterns and the frame border of the label 15.

Sixth Embodiment

A sixth embodiment of the present invention will be described hereinafter. A barcode reader according to the sixth embodiment has substantially the same hardware structure as the barcode reader 1 according to the first embodiment. For this reason, descriptions of the hardware structure of the barcode reader according to the sixth embodiment are omitted.

In the sixth embodiment, a control program installed in the memory 4 is partially different from that of the first embodiment, so that flow of operations executed by the control circuit 3 when the control circuit 3 runs the control program is partially different from that of operations executed by the control terminal 3 according to the first embodiment. These different points of the sixth embodiment against the first embodiment will be mainly described hereinafter.

In addition, in the sixth embodiment, barcode patterns of the RSS_Limited barcode, each of which coincides with part of barcode patterns of the UPC-A/EAN-13 barcode, have been stored in the memory 4.

Specifically, if it is determined that the determined symbology is the RSS_Limited (the determination in step A15 is YES), the control circuit 3 searches the barcode patterns stored in the memory 4 in step A20. Next, the control circuit 3 determines whether the barcode pattern of the RSS_Limited barcode decoded in step A7 coincides with at least one of the barcode patterns stored in the memory 4 based on the searched result in step A21.

If it is determined that there are no barcode patterns coinciding with the decoded barcode pattern (the determination in step A21 is NO), because the decoded barcode pattern of the RSS_Limited barcode is fixed not to be part of the UPC-A/EAN-13 barcode, the control circuit 3 exits the operations.

In contrast, if it is determined that there is at least one barcode pattern coinciding with the decoded barcode pattern (the determination in step A21 is YES), the control circuit 3 shifts to step A16 and carries out the operations of step A16 and over (see FIG. 2).

As set forth above, in the sixth embodiment, only if the decoded barcode pattern of the RSS_Limited barcode may erroneously determined as the UPC-A/EAN-13 barcode because the decoded barcode pattern of the RSS_Limited barcode coincides with part of barcode patterns of the UPC-A/EAN-13 barcode, it is possible to carry out the operations in step A16 and A17 like the first embodiment. This makes it possible to efficiently decode various symbologies of barcodes.

Seventh Embodiment

A seventh embodiment of the present invention will be described hereinafter. A barcode reader according to the seventh embodiment has substantially the same hardware structure as the barcode reader 1 according to the first embodiment. For this reason, descriptions of the hardware structure of the barcode reader according to the seventh embodiment are omitted.

In the seventh embodiment, a control program installed in the memory 4 is partially different from that of the first embodiment, so that flow of operations executed by the control circuit 3 when the control circuit 3 runs the control program is partially different from that of operations executed by the control terminal 3 according to the first embodiment. These different points of the seventh embodiment against the first embodiment will be mainly described hereinafter.

Specifically, after the operation in step A13, the control circuit 3 determines whether both the RSS_Limited barcode and at least one type of POS code are set to readout targets in step A22.

If it is determined that both the RSS_Limited barcode and at least one type of POS code are not set to readout targets, or any one of the RSS_Limited barcode and at least one type of POS code is set to a readout target, the determination in step A22 is NO, so that the control circuit 3 exits the operations.

Otherwise, if it is determined that both the RSS_Limited barcode and at least one type of POS code are set to readout targets, the determination in step A22 is YES, so that the control circuit 3 shifts to step A15 and carries out the operations of step A15 and over (see FIG. 2).

As set forth above, in the seventh embodiment, only if both the RSS_Limited barcode and at least one type of POS code are set to readout targets, it is free from the possibility of erroneously determining that the POS code as the RSS_Limited barcode. The control circuit 3 therefore carries out the operations in steps A15 to A17 like the first embodiment only when both the RSS_Limited barcode and at least one type of POS code are set to readout targets. This makes it possible to efficiently decode various symbologies of barcodes.

The present invention is not limited to the first to seventh embodiments described set forth above.

Specifically, readout of the barcode can be carried out using a line-sensor in place of the area sensor.

In the first embodiment, the determination of the maximum width of a bar in a UPC-A/EAN-13 barcode (first barcode) can be performed in the step A3 when detecting the width of each black bar. Note that, the maximum width cannot be determined based on actually readout barcode pattern. Specifically, pieces of data representing maximum widths of symbologies of barcodes, respectively, have been stored in the memory 4, so that the maximum width of one symbology of barcode can be determined based on the corresponding piece of data.

In the second embodiment, in step A18, the control circuit 3 can determine whether each black bar or space at both ends of the barcode has a width of any one of 1 to 4 modules in place of determining whether there is a specified character code or bar pattern of the symbology of UPC-A/EAN-13 at at least one of both ends of the barcode. Specifically, when it is determined that each black bar or space at both ends of the barcode has a width of any one of 1 to 4 modules, the control circuit 3 can determine that the decode is NG.

In the second embodiment, the operation of step A15 can be deleted from the flow of operations in the second embodiment as illustrated in FIG. 4. In this modification, the control circuit 3 determines whether there is a specified character code or bar pattern of the symbology of UPC-A/EAN-13 at at least one of both ends of the barcode independently of the symbology thereof.

In the fourth embodiment, if it is determined that the amount of margin is ensured along each of the check lines on a margin region at one end, the margin check at one end of the barcode can be OK. This can more securely determine whether there is presence or absence of margins at both ends of the barcode.

In the fourth embodiment, it is possible delete the operation in step B2 and to perform the operations of step B3 and over independently of whether the black bars of both ends of the code pattern are parallel to each other.

Any one of the margin check methods described in the fourth and fifth embodiment can be applied in, for example, step A17 of the first embodiment.

In the first embodiment, when being determined that there are a predetermined number and over black bars larger than the maximum width of a bar in a UPC-A/EAN-13 barcode at external side of at least one of both ends of the barcode, it is possible to determine the readout barcode as the RSS_Limited barcode.

Means for checking a margin is appropriately ensured according to each symbology of each barcode can be provided with respect to each symbology. This allows, when the symbology of a barcode is RSS_Limited with no margins, decode of the barcode to be immediately carried out without performing unnecessary margin checking operation.

The first and second barcodes are POS code and RSS_Limited barcode, respectively, but the present invention is not limited to the structure.

Specifically, when part of barcode pattern of a first barcode is equivalent to or close to barcode pattern of a second barcode, the barcode reader according to the present invention can be preferably adapted to the first and second barcodes.

Moreover, those skilled in the art will appreciate that the present invention is capable of being distributed as a program product, for example, the control program P, in a variety of forms. It is also important to note that the present invention applies equally regardless of the particular type of signal bearing media used to actually carry out the distribution. Examples of suitable signal bearing media include recordable type media such as floppy disks and CD-ROM, and transmission type media such as digital and analog communications links.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. A method of optically reading out one of a first barcode and a second barcode contained within a field of view based on differences between first and second formats respectively of the first barcode and the second barcode and of decoding information stored in the one of the first and second barcodes, each of the first and second barcodes being composed of linearly-aligned parallel bars, the first format of the first barcode defining a predetermined maximum margin width and a maximum number of bars, the second format of the second barcode defining a maximum number of bars, the maximum number of bars of the second format being smaller than the maximum number of bars of the first format, and a part of the first barcode and a part of the second barcode having an identical format of continuously and linearly-aligned parallel bars, the method comprising:

optically reading out the field of view including at least the identical format of continuously and linearly-aligned parallel bars and obtaining a binarized black and white pattern of the field of view, the black and white pattern being composed of black bars and white bars; wherein the optical readout of the one of the first and second barcodes uses an area sensor in two-dimension, and the determining whether there is a margin comprises:

setting a check line on one external side region of at least one of both ends of the black and white pattern, the check line extending outwardly from the at least one of both ends of the black and white pattern:

measuring a first height of the black and white pattern in a height direction, the height direction being orthogonal to a length direction of the black and white pattern;

measuring a second height of a bar on the check line in the height direction;

comparing the first height with the second height; and determining that the bar measured on the check line is a margin when the first height and the second height are different from each other;

subsequent to the optical reading, decoding the black and white pattern using an algorism corresponding to the second format;

subsequent to the decoding the black, determining whether there is a margin having a width greater than the predetermined maximum margin width of the first barcode and located at at least one of both ends of the black and white pattern;

subsequent to the determining whether there is a margin, determining that a result of the decoding is good when it is determined that there is a margin with having the width greater than the predetermined maximum margin width of the first barcode and located at at least one of both ends of the black and white pattern; wherein the method further comprises: storing a plurality of black and white patterns that are close to or equivalent to the part of the black and white pattern; and checking whether the black and white pattern coincides with any one of the stored plurality of black and white patterns, wherein the determining whether there is a margin is carried out when the black and white pattern coincides with any one of the stored plurality of black and white patterns.

2. A method according to claim 1, wherein the determining whether there is a margin includes:

firstly determining whether there is a white bar as the margin and located at at least one of both ends of the black and white pattern; and secondly determining whether there is a black bar located at at least one of both ends of the black and white pattern when it is determined that there is no white bar located at at least one of both ends of the black and white pattern.

3. A method according to claim 1, wherein the first barcode has a format of one of POS codes as the first format, and the second barcode has an RSS_Limited format as the second format.

4. A method according to claim 3, wherein each of the first and second barcodes has a bar with a narrowest width therein, and the narrowest width being set to a module, and the predetermined maximum margin width of the first bar is set to be equivalent to four times a width of the module.

5. A barcode reading apparatus capable of performing the method of claim 1.

6. A non-transitory, computer readable medium, having instructions thereon, which when executed by a computer processor, performs the steps of optically reading out one of a first barcode and a second barcode contained within a field of view based on differences between first and second formats respectively of the first barcode and the second barcode and of decoding information stored in the one of the first and second barcodes, each of the first and second barcodes being composed of linearly-aligned parallel bars, the first format of the first barcode defining a predetermined maximum margin width and a maximum number of bars, the second format of the second barcode defining a maximum number of bars, the maximum number of bars of the second format being smaller than the maximum number of bars of the first format, and a part of the first barcode and a part of the second barcode having an identical format of continuously and linearly-aligned parallel bars;

optically reading out the field, of view including at least the identical format of continuously and linearly-aligned parallel bars and obtaining a binarized black and white pattern of the field of view, the black and white pattern being composed of black bars and white bars;

subsequent to the optical reading, decoding the black and white pattern using an algorism corresponding to the second format;

subsequent to the decoding the black, determining whether there is a margin having a width greater than the predetermined maximum margin width of the first barcode and located at at least one of both ends of the black and white pattern;

subsequent to the determining whether there is a margin determining that a result of the decoding is good when it is determined that there is a margin having the width greater than the predetermined maximum margin width of the first bar and located at at least one of both ends of the black and white pattern;

subsequent to the determining whether there is a margin, determining that a result of the decoding is good when it is determined that there is a margin with having the width greater than the predetermined maximum margin width of the first barcode and located at at least one of both ends of the black and white pattern; wherein the method further comprises: storing a plurality of black and white patterns that are close to or equivalent to the part of the black and white pattern; and checking whether the black and white pattern coincides with any one of the stored plurality of black and white patterns, wherein the determining whether there is a margin is carried out when the black and white pattern coincides with any one of the stored plurality of black and white patterns.

7. A non-transitory, computer readable medium according to claim 6, wherein, when determining whether there is a margin, the means for instructing a computer further:

firstly determines whether there is a white bar as the margin and located at at least one of both ends of the black and white pattern; and secondly determines whether there is a black bar located at at least one of both ends of the black and white pattern when it is determined that there is no white bar located at at least one of both ends of the black and white pattern.

8. A non-transitory, computer readable medium according to claim 6, wherein, when determining whether there is a margin, the means for instructing a computer further:

stores a plurality of black and white patterns that are close to or equivalent to part of the black and white pattern; and checks whether the black and white pattern coincides with any one a the stored plurality of black and white patterns, wherein the determining whether there is a margin is carried out when the black and white pattern coincides with any one of the stored plurality of black and white patterns.

9. A non-transitory, computer readable medium according to claim 6, wherein the first barcode has a format of one of POS codes as the first format, and the second barcode has an RSS_Limited format as the second format.

10. A non-transitory, computer readable medium according to claim 9, wherein each of the first and second barcodes has a bar with a narrowest width therein, and the narrowest width being set to a module, and the predetermined maximum margin width of the first format is set to be equivalent to four times a width of the module.

\* \* \* \* \*